(12) United States Patent
Burton et al.

(10) Patent No.: US 10,676,368 B2
(45) Date of Patent: Jun. 9, 2020

(54) EMM-23 MATERIALS AND PROCESSES AND USES THEREOF

(71) Applicant: ExxonMobil Research and Engineering Company, Annandale, NJ (US)

(72) Inventors: Allen W. Burton, Stewartsville, NJ (US); Eugene Terefenko, Center Valley, PA (US); Mobae Afeworki, Phillipsburg, NJ (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 36 days.

(21) Appl. No.: 16/021,211

(22) Filed: Jun. 28, 2018

(65) Prior Publication Data

US 2019/0031519 A1  Jan. 31, 2019

Related U.S. Application Data

(60) Provisional application No. 62/537,694, filed on Jul. 27, 2017.

(51) Int. Cl.
| | |
|---|---|
| *C01B 39/02* | (2006.01) |
| *B01J 29/70* | (2006.01) |
| *C01B 39/48* | (2006.01) |
| *B01J 29/88* | (2006.01) |
| *B01J 29/86* | (2006.01) |
| *B01J 29/87* | (2006.01) |
| *B01J 29/89* | (2006.01) |
| *B01J 35/10* | (2006.01) |
| *C01B 37/02* | (2006.01) |

(52) U.S. Cl.
CPC ............... *C01B 39/48* (2013.01); *B01J 29/70* (2013.01); *B01J 29/86* (2013.01); *B01J 29/87* (2013.01); *B01J 29/88* (2013.01); *B01J 29/89* (2013.01); *B01J 35/1038* (2013.01); *C01B 37/02* (2013.01); *C01B 39/026* (2013.01); *C01P 2002/72* (2013.01); *C01P 2004/03* (2013.01)

(58) Field of Classification Search
CPC ........ C01B 39/026; C01B 39/48; B01J 29/70; B01J 37/08; B01J 29/86; B01J 29/87; B01J 29/88; B01J 29/89; B01J 35/1038; C01P 2002/72
See application file for complete search history.

(56) References Cited

U.S. PATENT DOCUMENTS

| | | | |
|---|---|---|---|
| 9,205,416 B2 | 12/2015 | Burton et al. | |
| 2014/0336394 A1* | 11/2014 | Burton | .............. B01J 29/70 548/524 |
| 2016/0039779 A1 | 2/2016 | Burton et al. | |

FOREIGN PATENT DOCUMENTS

| | | |
|---|---|---|
| EP | 2739567 B1 | 1/2017 |
| WO | 2013019462 A1 | 2/2013 |

OTHER PUBLICATIONS

The International Search Report and Written Opinion of PCT/US2018/039897 dated Oct. 4, 2018.
The International Search Report and Written Opinion of PCT/US2018/039903 dated Sep. 19, 2018.

(Continued)

*Primary Examiner* — David M Brunsman
(74) *Attorney, Agent, or Firm* — Priya G. Prasad

(57) ABSTRACT

The disclosure is related to various modified EMM-23 materials, processes, and uses of the same.

20 Claims, 7 Drawing Sheets

(56) References Cited

OTHER PUBLICATIONS

Willhammar et al., "EMM-23: A Stable High-Silica Multidimensional Zeolite with Extra-Large Trilobe-Shaped Channels", JACS, 2014, 136(39), 13570-13573.
Willhammar et al., "Supporting Information : EMM-23: A Stable High-Silica Multidimensional Zeolite with Extra-Large Trilobe-Shaped Channels", Oct. 19, 2014, pp. S1-S14, XP55505632, Retrieved from the internet: URL:https://pubs.acs.org/doi/suppl/10.1021/ja507615b/suppl_file/ja507615b_si_001_pdf [retrieved on Oct. 31, 2018] p. S6, figure S4.
Willhammar et al., "EMM-23: A Stable High-Silica Multidimensional Zeolite with Extra-large Trilobe Channels", J. Am. Chem. Soc., 2014, 136 (39), pp. 13570-13573.
Kramer et al., "Hydride Transfer and Olefin Isomerization as Tools to characterize Liquid and Solid Acids", Acc. Chem. Res. 1986, 19, 78-84.
Kramer et al., "On the Question of Carbonium Ions as Intermediates over Silica-Alumina and Acidic Zeolites", Journal of Catalysis 92, 355-363 (1985).
Lippens et al., "Studies on Pore Systems in Catalysts V. The t Method", Journal of Catalysis 319-323 (1965).
Miale et al., "Catalysis by Crystalline Aluminosilicates IV. Attainable Catalytic Cracking Rate Constants , and Superactivity", Journal of Catalysis 6, 278-287 (1965).
Weisz et al., "Superactive Crystalline Aluminosilicated Hydrocarbon Catalysts", Journal of Catalysis 4, 527-529 (1965).

\* cited by examiner

EMM-23 MATERIALS AND PROCESSES AND USES THEREOF

CROSS-REFERENCE TO RELATED APPLICATIONS

This application claims priority to U.S. Provisional Application Ser. No. 62/537,694, filed on Jul. 27, 2017, which is herein incorporated by reference in its entirety.

This application is related to U.S. Provisional Application Ser. No. 62/537,681, filed on Jul. 27, 2017, entitled, "EMM-23 Materials and Processes and Uses Thereof", which is herein incorporated by reference in its entirety

FIELD

This disclosure relates to materials designated as EMM-23, processes of making such materials, and uses of these materials.

BACKGROUND

EMM-23 is a crystalline or substantially crystalline material. It is described as a molecular sieve in U.S. Pat. No. 9,205,416, the content of which is incorporated herein by reference in its entirety. Molecular sieves can be used as adsorbents and catalysts or support for catalysts for hydrocarbon conversions. EMM-23 has a crystalline structure that can be identified by X-ray diffraction (XRD) as described in U.S. Pat. No. 9,205,416. EMM-23 has uniform cavities and pores that are interconnected by channels. The sizes and dimensions of cavities and the pores allow for adsorption of molecules of certain sizes. Due to its ability to adsorb molecules through size selections, EMM-23 has many uses including hydrocarbon conversions, e.g., cracking, hydrocracking, disproportionation, alkylation, oligomerization, and isomerization.

EMM-23 can be prepared from a mixture of sources of water, hydroxide ions, oxide of a tetravalent element, optionally a trivalent element, and a structure directing agent. The structure directing agent may be an organic molecule such as a diquaternary ammonium molecule. EMM-23 materials as-made from these sources may contain the structure directing agent in the crystalline framework. Thermal treatment (e.g., calcination) of the as-made EMM-23 would generate the EMM-23 free of the structure directing agent. While EMM-23 has been previously described in U.S. Pat. No. 9,205,416, there remains a desire for modified materials of EMM-23 with improved properties.

SUMMARY

This disclosure provides improved processes of preparing modified EMM-23 materials with improved properties such as stability, providing reactivity, and/or enhancing reactivity.

In one aspect, this disclosure provides a process of preparing a modified EMM-23 material comprising a composition of Formula II:

$$X_2O_3:(m)YO_2 \quad \text{(Formula II)},$$

comprising combining a composition of Formula (III):

$$X_2O_3:(t)YO_2 \quad \text{(Formula III)},$$

with an agent comprising X to generate a material of Formula II;

wherein m is less than 150, t is greater than or equal to 150, X is a trivalent element, and Y is a tetravalent element.

In a further aspect, this disclosure provides a material having a composition comprising Formula II, wherein the material is substantially free of impurity.

In another aspect, this disclosure provides a modified EMM-23 material having at least four XRD peaks (degree 2-theta) selected from Table 4:

TABLE 4

| degree 2-theta (±0.20) | Relative intensity [100 × I/(Io)] (±30%) |
|---|---|
| 5.23 | 100 |
| 8.40 | 32 |
| 9.06 | 68 |
| 15.98 | 15 |
| 23.81 | 50 |
| 24.07 | 15 |

In one or more aspects, the modified EMM-23 material may have at least four XRD peaks with the degree 2-theta and d-spacing values selected from Table 4A, wherein the d-spacing values have a deviation determined based on the corresponding deviation ±0.20 degree 2-theta when converted to the corresponding values for d-spacing using Bragg's law.

TABLE 4A

| degree 2-theta (±0.20) | d-spacing (Å) | Relative intensity [100 × I/(Io)] (±30%) |
|---|---|---|
| 5.23 | 16.87 | 100 |
| 8.40 | 10.51 | 32 |
| 9.06 | 9.76 | 68 |
| 15.98 | 5.54 | 15 |
| 23.81 | 3.73 | 50 |
| 24.07 | 3.69 | 15 |

Any two or more of the features described in this specification, including in this summary section, can be combined to form combination of features not specifically described herein. The details of one or more features are set forth in the accompanying drawings and the description below. Other features and advantages will be apparent from the description and drawings, and from the claims.

DETAILED DESCRIPTION

Figure 1:
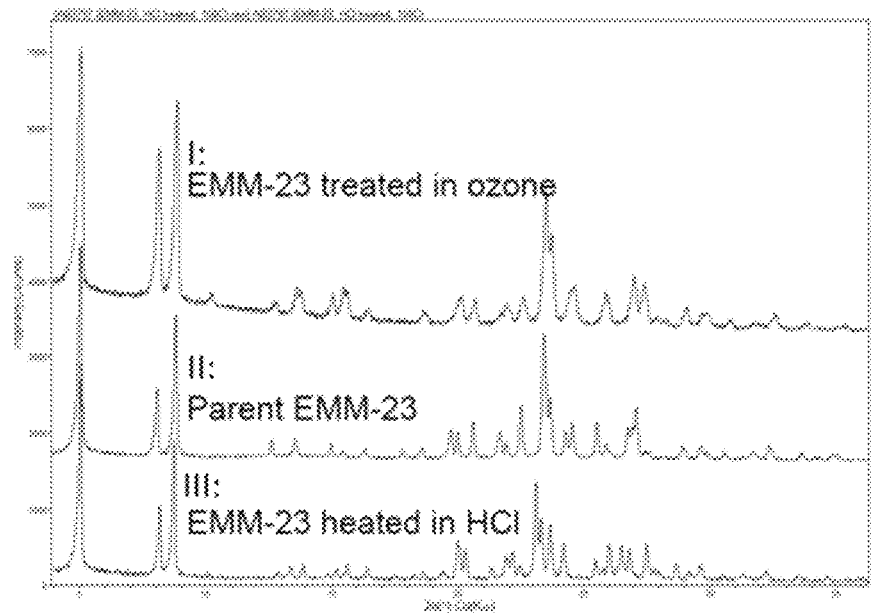
FIG. 1 shows powder XRD patterns of parent (un-modified) EMM-23, modified EMM-23-treated with ozone, and modified EMM-23-treated with HCl.

Provided herein are various modified EMM-23 materials, processes of preparing these materials, and uses thereof. The thermally-treated (e.g. calcined, which may be referred to herein as "as-calcined") form of EMM-23 may be described as having a chemical composition of oxides of a trivalent element (e.g., $X_2O_3$) and oxides of a tetravalent element (e.g., $YO_2$), where these oxides can be in various molar ratios. X is a trivalent element and Y is a tetravalent element. The as-made EMM-23 (i.e., before thermal treatment or other treatment to remove SDA, which may be referred to herein as "as-synthesized") may include the structure directing agent (SDA), as one of the reagents of the synthesis. Thermal treatment (e.g., calcination) of the as-made EMM-23 typically exposes the materials to high temperatures, e.g., to 400-600° C., in an atmosphere selected from air, nitrogen, or a mixture thereof, to remove the SDA, which can lead to partial amorphitization of the crystalline EMM-23. This disclosure provides new modified EMM-23 materials and improved processes of preparing these materials that can reduce amorphitization during thermal treatment.

I. Acid and Salt Treatments

In one aspect, this disclosure provides a process of preparing a modified EMM-23 material that has been treated with an acid and/or an ammonium salt before thermal treatment (e.g., calcination). Such treatments with acids and/or ammonium salt are beneficial to stabilize the material from amorphitization. Amorphitization of EMM-23 materials converts the crystalline materials into an amorphous form, which is not catalytically active and thus, it is desirable to minimize amorphitization. These treatments incorporate anions as extra-framework species in EMM-23, which may subsequently be anion-exchanged with salts. The ability to anion exchange with salts allows for dispersion of catalytically active species within the cavities and pores of the modified EMM-23 material.

The acid and/or ammonium salt treatment process may be used, for example, to prepare a modified EMM-23 material that includes a composition of Formula IA:

$(v)X_2O_3:YO_2$      (Formula IA).

The process for preparing a composition of Formula IA includes mixing a composition of Formula IB:

$(q)T:(v)X_2O_3:YO_2$      (Formula IB), with an acid and/or an ammonium salt to generate the modified EMM-23 material comprising the composition of Formula IA; where $0 \leq q \leq 0.5$, $0 \leq v \leq 0.1$, T is an organic structure directing agent, X is a trivalent element, and Y is a tetravalent element. X may be selected from B, Al, Fe, Ga, or a mixture thereof. For example, X may comprise or be Al. Y may be selected from Si, Ge, Sn Ti, Zr, or a mixture thereof. For example, Y may comprise or be Si. T may comprise or be a pyrrolidinum dication. Examples of T may include 1,5-bis(N-propylpyrrolidinium)pentane dication, 1,6-bis(N-propylpyrrolidinium)hexane dication, 1,4-bis(N-methylpyrrolidinum)butane dication, or a mixture thereof.

The mixing may be carried out in a solvent. In one or more aspects, the solvent may be a polar solvent that is sufficient to dissolve the ammonium salt. Examples of polar solvents may include a protic solvent such as water, methanol, ethanol, or a mixture thereof. Other examples of polar solvents may also include acetonitrile, dimethylformamide, dimethyl sulfoxide, or a mixture thereof.

Suitable salts and acids may include agents whose anions can be incorporated as extra-framework species and/or that increase the stability of EMM-23 during thermal treatment (e.g., calcination). Extra-framework incorporation is referring to anions that are associated with the framework through ionic interaction. During thermal treatment, the anions from the salts and/or acids may be incorporated into the framework through covalent bonds, which may occur when using salts and acids that contain non-volatile anions that would not be volatilized during the thermal treatment.

Suitable salts and acids may include agents that comprise a $ZO_4$ or $ZO_3$ ion, where Z is phosphorus, vanadium, or a mixture thereof. For example, the salt or acid may provide a $(PO_4)^{3-}$ or $(VO_3)^{1-}$ ion. Although phosphate ions $(PO_4)^{3-}$ may be specifically referred to herein, it is understood that any suitable $ZO_4$ or $ZO_3$ ion may be used with such aspects of the present disclosure and, upon incorporation of such into the framework of Formula IA, Formula IA may be expressed as $(s)Z_2O_5:(v)X_2O_3:YO_2$. In one or more aspects, variable s may be greater than 0 and less than or equal to 0.025 ($0<s \leq 0.025$). The variable s represents the relative molar ratio of $Z_2O_5$ in Formula IA.

Suitable ammonium salts may be selected from $NH_4Cl$, $NH_4F$, $(NH_4)_2HPO_4$, $(NH_4)_2SO_4$, $NH_4(VO_3)$, or a mixture thereof. For example, the ammonium salt may comprise or be $(NH_4)_2HPO_4$. For example, the ammonium salt may comprise or be $NH_4Cl$, e.g., a 1M $NH_4Cl$ solution. Examples of acids may be selected from HCl, $HNO_3$, $H_3PO_4$, HI, $H_2SO_4$, $H_2SO_3$, HBr, $HNO_2$, carboxylic acids, or a mixture thereof. The carboxylic acids may be organic carboxylic acids. Examples of carboxylic acids may be selected from formic acid, acetic acid, propionic acid, butyric acid, and the like. In one or more aspects, the acid may comprise or be $H_3PO_4$.

The reagents (e.g., a composition of Formula IB and an acid and/or ammonium salt) are mixed for a period time sufficient for the acids and/or ammonium salts to react with the structure directing agent and/or to be incorporated into the composition of Formula IB as extra-framework species. For example, the mixing may be carried out for 1 to 24, 1 to 18, 1 to 16, 1 to 14, 1 to 12, 1 to 10, 1 to 8, 1 to 6, 1 to 4, or 1 to 2 hours. The mixing can be carried out at room temperature or at elevated temperatures such as at refluxing temperature of the mixture or heating in a sealed autoclave, which generates pressure. As an example, mixing of a composition of Formula IB and 1M $NH_4Cl$ may be carried out at the refluxing temperature of the mixture of the composition of Formula IB and 1M $NH_4Cl$ for 1 to 24 hours.

The process may further include filtering the mixture of the composition of Formula IB and the acids and/or ammonium salts to remove a composition comprising excess acid, ammonium salt, optionally solvent if present during mixing, or a mixture thereof, to obtain a filtered composition of Formula IB. The filtering may also remove any unwanted impurities. The filtered composition may be washed with a wash solvent, which may be the same or a different solvent as the solvent used during the mixing of the composition of Formula IB and the acid and/or ammonium salt. For instance, the wash solvent may be water. The filtered composition includes ions from the acid and/or ammonium salt.

In one or more aspects, the filtered composition may be heated to provide the thermally-treated (e.g., calcined) product substantially free of the structure directing agent (e.g., at least 50%, at least 60%, at least 70%, at least 80%, at least 90%, at least 95%, at least 97%, or at least 99% by weight of the material is free of the structure directing agent (i.e., is the weight percentage based on the total weight of the material that is non-SDA material)). The heating may be at a temperature from 100 to 650, 200 to 600, 300 to 600, 400 to 550, or 500 to 550° C. in an atmosphere selected from air, nitrogen or mixture thereof. For example, the heating may be at a temperature of 540° C. Unless indicated otherwise herein, the temperature measured is the temperature of the surrounding environment of the material being heated, for example the temperature of the atmosphere in which the material is heated. The heating of the filtered composition (composition of Formula IB) may be from 1 hour to 14 days or until the composition of Formula IA is formed (e.g., until at least 80% by volume (% v), at least 90% v, or at least 95% v of the material heated is the composition of Formula IA). In one or more aspects, the heating may be from 1 hour to 7 days, from 12 hours to 5 days, from 1 day to 3 days, or from 1 day to 2 days. For example, the heating may be from 1 day to 2 days.

In one or more other aspects, the filtered composition may be treated with ozone to provide the product substantially free of the structure directing agent (e.g., at least 50%, at least 60%, at least 70%, at least 80%, at least 90%, at least 95%, at least 97%, or at least 99% by weight of the material is free of the structure directing agent (i.e., is the weight percentage based on the total weight of the material that is non-SDA material)). The ozone treatment may include heating in the presence of ozone, such heating may be at a temperature from 50 to 400, 100 to 300, or 125 to 250° C. The heating during ozone treatment of the filtered composition (composition of Formula IB) may be for a time period from 1 hour to 14 days or until the composition of Formula IA is formed (e.g., until at least 80% by volume (% v), at least 90% v, or at least 95% v of the material heated is the composition of Formula IA). In one or more aspects, the heating may be from 0.5 hour to 4 days, from 1 hour to 3 days, or from 2 hours to 2 days. Although the EMM-23 materials may be referred to herein as thermally-treated (e.g., calcined), it is understood that ozone treatment to remove all or a portion of the SDA may be used alternatively or additionally to thermal treatment for a SDA removal treatment.

In one or more aspects, the composition of Formula IA which incorporates $ZO_4$ or $ZO_3$ (e.g., phosphate) ions into the framework of Formula IA (which may be expressed as $(s)Z_2O_5:(v)X_2O_3:YO_2$) can exhibit activity for methyl shifts, as described by the McVicker test, as discussed herein. A useful scale of acidity for catalysts is based on the isomerization of 2-methyl-2-pentene as described by Kramer and McVicker, Acc. Chem. Res. 19 (1986) 78 or Kramer and McVicker, J. Catalysis, 92, 355 (1985). In this scale of acidity, 2-methyl-2-pentene is subjected to the catalyst to be evaluated (e.g., 0.7 grams) at a fixed temperature (e.g., 350° C.). In the presence of catalyst sites, 2-methyl-2-pentene forms a carbenium ion. The isomerization pathway of the carbenium ion is indicative of the acidity of active sites in the catalyst. Thus, weakly acidic sites form 4-methyl-2-pentene whereas strongly acidic sites result in a skeletal rearrangement to 3-methyl-2-pentene with very strongly acidic sites forming 2,3-dimethyl-2-butene. The mole ratio of 3-methyl-2-pentene to 4-methyl-2-pentene can be correlated to a scale of acidity, which ranges from 0.0 to 4.0. Very weakly acidic sites will have values near 0.0 whereas strongly acidic sites will have values approaching 4. Similarly, the ratio of 2,3-dimethyl-2-butene to 4-methyl-2 pentene can be used to as an additional measure of acidity which ranges from 0.0 to 1.0. Weak acidic sites will have values near 0.0 whereas very strongly acidic sites will have values approaching 1. In one or more aspects, the composition of Formula IA which incorporates $ZO_4$ or $ZO_3$ (e.g., phosphate) ions into the framework of Formula IA (which may be expressed as $(s)Z_2O_5:(v)X_2O_3:YO_2$) may have an acidity value defined by the ratio of 3-methylpent-2-ene/4-methyl-2-pentene ranging from 0.1 to 4.0 and/or a ratio of 2,3-dimethyl-2-butene/4-methyl-2-pentene ranging from 0.1 to 1.0, as described by Kramer and McVicker, Acc. Chem. Res. 19 (1986) 78 or Kramer and McVicker, J. Catalysis, 92, 355 (1985). In one or more aspects, the composition of Formula IA which incorporates $ZO_4$ or $ZO_3$ (e.g., phosphate) ions into the framework of Formula IA and has been treated with ozone to remove the SDA present (which may be expressed as $(s)Z_2O_5:(v)X_2O_3:YO_2$) may have greater ratio of 3-methylpent-2-ene/4-methyl-2-pentene and/or greater ratio of 2,3-dimethyl-2-butene/4-methyl-2-pentene, as described by Kramer and McVicker, Acc. Chem. Res. 19 (1986) 78 or Kramer and McVicker, Acc. Chem. Res. 19 (1986) 78, as compared to the same material that has been thermally treated (e.g., calcined) to remove the SDA present.

The variable q is greater than or equal to 0 and less than or equal 0.5. The variable q represents the relative molar ratio of structure directing agent T in Formula IB. The variable v is greater than or equal to 0 and less than or equal to 0.1. Variable v defines the relative molar ratio of $X_2O_3$ in Formula IB.

In one or more aspects, the overall process of preparing an EMM-23 material comprising a composition of Formula IA may include the following:
(i) mixing a composition of Formula IB with an acid and/or an ammonium salt optionally in a solvent;
(ii) filtering the mixture of the composition of Formula IB and the acid and/or ammonium salt to remove a composition comprising excess acid, ammonium salt, solvent, or a mixture thereof, to obtain a filtered composition of Formula IB.
(iii) optionally washing the filtered composition with a wash solvent; and
(iv) heating the filtered composition to obtain the composition of Formula IA.

In one or more aspects, the modified EMM-23 materials prepared by the processes that involve Formula IA may be substantially free of amorphous materials (e.g., least 50%, at least 60%, at least 70%, at least 80%, at least 90%, at least 95%, at least 97%, or at least 99% by weight of the material is free of amorphous materials (i.e., is the weight percentage based on the total weight of the material that is non-amorphous material)), which may be generated during thermal treatment to remove the SDA (e.g., calcination). The acid and/or ammonium salt treatment processes improves the stability of the material during thermal treatment while maintaining the structural integrity and purity of the thermally-treated product, e.g., reduced amorphitization of the material. The structural integrity of the material may be assessed by the intensities of the XRD pattern (e.g., sharpness of the intensities) and/or the micropore volume (e.g. diminution of the volume).

The thermally-treated modified EMM-23 materials prepared by the acid and/or ammonium salt treatment processes may lead to incorporation of the anionic species into the framework of EMM-23. For example, occluded phosphate ions may fill all or a portion of the vacancy sites in the framework during thermal treatment and may be incorporated into the framework (e.g., through covalent bonds). EMM-23 has an unusual high density of vacancy sites where certain T atoms are absent. See T. Willhammar et al., J. Am. Chem. Soc., 2014, 136, 13570-13573. The as-made (e.g., pre-calcined, as-synthesized) modified EMM-23 material may have a composition of Formula IB and phosphate ions; wherein the composition has a hexagonal unit cell a-parameter of 20.0±0.5 Å and c-parameter of 13.8±0.5 Å. After thermal treatment, such material has a composition of Formula IA with phosphate ions incorporated within the framework of Formula IA; where the composition has a hexagonal unit cell a-parameter of 19.8±0.5 Å and c-parameter of 13.5±0.5 Å. In such aspects, Formula IA may be expressed as $(s)P_2O_5:(v)X_2O_3:YO_2$. In one or more aspects, variable s may be greater than 0 and less than or equal to 0.025 ($0<s\le0.025$). The variable s represents the relative molar ratio of $P_2O_5$ in Formula IA.

In one or more aspects, the thermally-treated material that has been treated with an acid and/or ammonium salt comprising phosphate ions (e.g., phosphoric acid) may have at least three XRD peaks (degree 2-theta) selected from Table 1:

TABLE 1

| degree 2-theta (±0.20) | Relative intensity [100 × I/(Io)] (±30%) |
|---|---|
| 5.14 | 100 |
| 8.32 | 50 |
| 8.94 | 76 |
| 23.66 | 54 |
| 23.91 | 25 |
| 24.77 | 23 |

In one or more aspects, the thermally-treated material that has been treated with an acid and/or ammonium salt comprising phosphate ions (e.g., phosphoric acid) may have at least three XRD peaks with the degree 2-theta and d-spacing values selected from Table 1A, wherein the d-spacing values have a deviation determined based on the corresponding deviation ±0.20 degree 2-theta when converted to the corresponding values for d-spacing using Bragg's law:

TABLE 1A

| degree 2-theta (±0.20) | d-spacing (Å) | Relative intensity [100 × I/(Io)] (±30%) |
|---|---|---|
| 5.14 | 17.18 | 100 |
| 8.32 | 10.62 | 50 |
| 8.94 | 9.88 | 76 |
| 23.66 | 3.76 | 54 |
| 23.91 | 3.72 | 25 |
| 24.77 | 3.59 | 23 |

The material may have at least four, at least five, or six XRD peaks selected from Table 1 or 1A. The XRD patterns with the XRD peaks described herein use $Cu(K_\alpha)$ radiation. In one or more aspects, the material may have at least three, at least four, at least five, or six XRD peaks selected from Table 1 or 1A and a hexagonal unit cell a-parameter of 19.8±0.5 Å and c-parameter of 13.5±0.5 Å. It is understood that the values for d-spacing would vary accordingly with the degree 2-theta values and thus, the corresponding deviation ±0.20 degree 2-theta would vary accordingly when converted to the corresponding values for d-spacing using Bragg's law. Although the deviation of ±0.20 degree 2-theta may be referred to herein, it is understood that a deviation of ±0.10 degree 2-theta may be used with the various aspects of the present disclosure. The amount of phosphorus incorporated into the framework of the material may be from 0.5 to about 3 wt % or from 0.75 to 2 wt %, e.g., 1 wt %, based on the total weight of the material (e.g., Formula IA material including the phosphate ions incorporated into the framework).

In one or more aspects, the thermally-treated material that has been treated with an acid and/or ammonium salt comprising phosphate ions (e.g., phosphoric acid) may have at least three XRD peaks (degree 2-theta) selected from Table 2:

TABLE 2

| degree 2-theta (±0.20) | Relative intensity [100 × I/(Io)] (±30%) |
|---|---|
| 5.14 | 100 |
| 8.32 | 50 |
| 8.94 | 76 |
| 14.12 | 13 |
| 15.21 | 13 |
| 23.66 | 54 |
| 23.91 | 25 |
| 24.21 | 15 |
| 24.77 | 23 |

In one or more aspects, the thermally-treated material that has been treated with an acid and/or ammonium salt comprising phosphate ions (e.g., phosphoric acid) may have at least three XRD peaks with the degree 2-theta and d-spacing values selected from Table 2A, wherein the d-spacing values have a deviation determined based on the corresponding deviation ±0.20 degree 2-theta when converted to the corresponding values for d-spacing using Bragg's law:

TABLE 2A

| degree 2-theta (±0.20) | d-spacing (Å) | Relative intensity [100 × I/(Io)] (±30%) |
|---|---|---|
| 5.14 | 17.18 | 100 |
| 8.32 | 10.62 | 50 |
| 8.94 | 9.88 | 76 |
| 14.12 | 6.27 | 13 |
| 15.21 | 5.82 | 13 |
| 23.66 | 3.76 | 54 |
| 23.91 | 3.72 | 25 |
| 24.21 | 3.67 | 15 |
| 24.77 | 3.59 | 23 |

The material may have at least four, at least five, at least six, at least seven, at least eight, or nine XRD peaks selected from Table 2 or 2A. In one or more aspects, the material may have at least three, at least four, at least five, at least six, at least seven, at least eight, or nine XRD peaks selected from Table 2 or 2A and a hexagonal unit cell a-parameter of 19.8±0.5 Å and c-parameter of 13.5±0.5 Å.

In one or more aspects, the thermally-treated material that has been treated with an acid and/or ammonium salt comprising phosphate ions (e.g., phosphoric acid) may have at least three XRD peaks (degree 2-theta) selected from Table 3:

TABLE 3

| degree 2-theta (±0.20) | Relative intensity [100 × I/(Io)] (±30%) |
|---|---|
| 5.14 | 100 |
| 8.32 | 50 |
| 8.94 | 76 |
| 14.12 | 13 |
| 15.21 | 13 |
| 15.57 | 11 |
| 15.92 | 11 |
| 20.42 | 12 |
| 20.80 | 10 |
| 22.36 | 11 |
| 23.66 | 54 |
| 23.91 | 25 |
| 24.21 | 15 |
| 24.77 | 23 |
| 26.11 | 10 |
| 27.15 | 12 |

In one or more aspects, the thermally-treated material that has been treated with an acid and/or ammonium salt comprising phosphate ions (e.g., phosphoric acid) may have at least three XRD peaks with the degree 2-theta and d-spacing values selected from Table 3A, wherein the d-spacing values have a deviation determined based on the corresponding deviation ±0.20 degree 2-theta when converted to the corresponding values for d-spacing using Bragg's law:

TABLE 3A

| degree 2-theta (±0.20) | d-spacing (Å) | Relative intensity [100 × I/(Io)] (±30%) |
|---|---|---|
| 5.14 | 17.18 | 100 |
| 8.32 | 10.62 | 50 |
| 8.94 | 9.88 | 76 |
| 14.12 | 6.27 | 13 |
| 15.21 | 5.82 | 13 |
| 15.57 | 5.69 | 11 |
| 15.92 | 5.56 | 11 |
| 20.42 | 4.35 | 12 |
| 20.80 | 4.27 | 10 |
| 22.36 | 3.97 | 11 |
| 23.66 | 3.76 | 54 |
| 23.91 | 3.72 | 25 |
| 24.21 | 3.67 | 15 |
| 24.77 | 3.59 | 23 |
| 26.11 | 3.41 | 10 |
| 27.15 | 3.28 | 12 |

The material may have at least four, at least five, at least six, at least seven, at least eight, at least nine, at least ten, at least eleven, at least twelve, at least thirteen, at least fourteen, at least fifteen, or sixteen XRD peaks selected from Table 3 or 3A. In one or more aspects, the material may have at least three, at least four, at least five, at least six, at least seven, at least eight, at least nine, at least ten, at least eleven, at least twelve, at least thirteen, at least fourteen, at least fifteen, or sixteen XRD peaks selected from Table 3 or 3A and a hexagonal unit cell a-parameter of 19.8±0.5 Å and c-parameter of 13.5±0.5 Å.

II. Incorporation of Additional Trivalent Element

Also, provided herein are additional modified EMM-23 materials that include a relatively large amount of trivalent element (e.g., aluminum). Such modified EMM-23 material having more trivalent element is more stable during thermal treatment (e.g., calcination) or in its final thermally-treated form than a material with less trivalent element. It can be difficult to prepare an EMM-23 material having an atomic ratio of a tetravalent element to trivalent element of less than 75 (e.g., Si/Al less than 75). One possible route to incorporate more trivalent element into EMM-23 is by increasing the amount of trivalent element sources in the mixture to prepare the as-made EMM-23 material. However, such a process does not incorporate much additional trivalent element into EMM-23 and the reproducibility of EMM-23 appears to be sensitive to the presence of trivalent element and can lead to undesirable impurities. Described herein are trivalent modified EMM-23 materials having a molar ratio of tetravalent element to trivalent element of less than 75 prepared by a process that involves incorporating the trivalent element into the thermally treated EMM-23 material.

In one or more aspects, the trivalent element modified EMM-23 materials may have composition of Formula II:

$$X_2O_3{:}(m)YO_2 \quad \text{(Formula II).}$$

Such materials may be formed by a process that includes combining a composition of Formula (III):

$$X_2O_3{:}(t)YO_2 \quad \text{(Formula III),}$$

with an agent comprising X to generate the modified EMM-23 material comprising the composition of Formula II. The variable m is less than 150, t is greater than or equal to 150, X is a trivalent element, and Y is a tetravalent element. X may be selected from B, Al, Fe, Ga, or a mixture thereof. For example, X may comprise or be Al. Y may be selected from Si, Ge, Sn Ti, Zr, or a mixture thereof. For example, Y may comprise or be Si.

Suitable agents that comprise trivalent element X may be selected from $Al(NO_3)_3$, $Al_2(SO_4)_3$, $AlCl_3$, $Fe(NO_3)_3$, or a mixture thereof. For example, the agent may comprise or be $Al(NO_3)_3$. The suitable agents may be in the form of a solution.

Adding the agent comprising X can decrease the pH of the combination as protons are released when the trivalent element X reacts with the silanol group in the framework of the composition of Formula III. In one or more aspects, the process may include adjusting the pH after combining the composition of Formula III and the agent comprising X to the pH (±0.2 or ±0.1) of the solution of the agent comprising X prior to combining, which pH prior to combining may be in the range of from 2.4 to 2.6. Removing the excess protons by adjusting the pH can increase the amount of trivalent element X incorporated into the thermally-treated EMM-23 material of Formula III. Optionally, after adjusting the pH, the process may further include combining an additional amount of the agent comprising X to the pH-adjusted combination including the composition of Formula III, and further adjusting the pH of the combination having the additional amount of the agent comprising X to a pH of the agent comprising X prior to combining, which pH prior to combining may be in the range of from 2.4 to 2.6. This process of adding the agent comprising X and adjusting the pH to ±0.2 or ±0.1 of the pH of the agent comprising X prior to combining may be repeated until the pH does not change when an additional amount of the agent comprising X is added to the combination including the composition of Formula III.

Adjusting the pH of the combination of the composition of Formula III and the agent comprising X may include adding a base or an acid to the combination, as appropriate. It is desirable to use a base when adjusting the pH to increase the pH, for example to increase the pH to ±0.2 or ±0.1 of the pH of the agent comprising X prior to combining. For example, the base may be an organic base or a hydroxide base. The organic base may be an organic amine base, e.g., methylamine, dimethylamine, trimethylamine, aniline, and the like. The hydroxide base may be ammonium hydroxide.

In one or more aspects, the hydroxide base does not comprise (is free of) an alkali metal such as sodium hydroxide. The pH may be measured with a Thermo Orion® Model 310 pH instrument using a Ag/AgCl glass electrode. The pH may be measured at ambient temperature. Ambient temperature may range between 20 to 25° C. with minimal impact on pH. The calibration of the pH meter may be carried out as 2-point calibration using a pH=4.01 standard buffer solution and a pH=7.00 standard buffer solution.

The pH-adjusted combination of the composition of Formula III and the agent comprising X is heated at a temperature for a period of time sufficient to maximize the amount of trivalent element incorporation, e.g., from 50 to 200° C. for 1 to 48 hours. The heating may be at a temperature from 80 to 180 or 100 to 160° C. (e.g., 100, 120, 140, or 160° C.). The period of time for heating may be from 1 to 48, 1 to 24, 4 to 18, 6 to 18, 6 to 16, 10 to 16, or 12 to 16 hours. For example, the period of time for heating may be from 6 to 18 or 12 to 16 hours.

In one or more aspects, the overall process of preparing a trivalent element modified EMM-23 material comprising a composition of Formula II may include the following:
(i) combining a composition of Formula III with an agent comprising X;
(i) optionally adjusting the pH of the combination of the composition of Formula III and the agent comprising X to a pH within ±0.2 or ±0.1 of the pH of the agent comprising X prior to combining, which pH prior to combining may be in the range of 2.4 to 2.6;
(ii) heating the pH adjusted combination of the composition of Formula III and the agent comprising X at a temperature from 50° C. to 200° C. and a time from 1 to 48 hours.

The trivalent element modified EMM-23 material comprising the composition of Formula II may be substantially free of one or more impurities (e.g., least 50%, at least 60%, at least 70%, at least 80%, at least 90%, at least 95%, at least 97%, or at least 99% by weight of the material is free of impurities (i.e., is the weight percentage based on the total weight of the material that is the modified EMM-23 material and not impurities)), such as zeolite beta, ZSM-5, or a mixture thereof. The trivalent element modified EMM-23 material comprising the composition of Formula II may be substantially free of one or more impurities such that no other phase such as zeolite beta, ZSM-5, or a mixture thereof can be identified in the XRD pattern of the modified EMM-23 material. The trivalent element modified EMM-23 material comprising a composition of Formula II may have an alpha value of greater than 10. The alpha value of the composition of Formula II may be greater than 20, greater than 30, greater than 40, or greater than 50. In some examples, the alpha value may be from 15 to 50, 20 to 40, or 30 to 35.

The variable m is less than 150 and t is greater than or equal to 150. The variable m represents the molar ratio of $YO_2$ in Formula II. The variable t represents the molar ratio of $YO_2$ in Formula III. When m is less than 150, this is equivalent to an atomic ratio of Y/X<75 (e.g., Si/Al<75). When t is equal to or greater than 150, this is equivalent to an atomic ratio of Y/X≥75 (e.g., Si/Al≥75). In one or more aspects, m may be less than 120 (i.e., Y/X<60), less than 110 (i.e., Y/X<55), less than 100 (i.e., Y/X<50), less than 80 (i.e., Y/X<40), less than 60 (i.e., Y/X<30), less than 40 (i.e., Y/X<20), less than 20 (i.e., Y/X<10), or less than 10 (i.e., Y/X<5). The variable m may be from 80 to 130 or 90 to 120.

The EMM-23 material comprising a composition comprising Formula II may have a micropore volume greater than 0.15 cc/g. The micropore volume may be from 0.15 to 0.30, 0.25 to 0.30 cc/g, or 0.20 to 0.30 cc/g. The trivalent element modified EMM-23 material may have a cell a-parameter of 19.6±0.5 Å and c-parameter of 13.5±0.5 Å.

The trivalent element modified EMM-23 material comprising the composition of Formula II may have at least four XRD peaks (degree 2-theta) selected from Table 4:

TABLE 4

| degree 2-theta (±0.20) | Relative intensity [100 × I/(Io)] (±30%) |
|---|---|
| 5.23 | 100 |
| 8.40 | 32 |
| 9.06 | 68 |
| 15.98 | 15 |
| 23.81 | 50 |
| 24.07 | 15 |

In one or more aspects, the trivalent element modified EMM-23 material comprising the composition of Formula II may have at least four XRD peaks with the degree 2-theta and d-spacing values selected from Table 4A, wherein the d-spacing values have a deviation determined based on the corresponding deviation ±0.20 degree 2-theta when converted to the corresponding values for d-spacing using Bragg's law:

TABLE 4A

| degree 2-theta (±0.20) | d-spacing (Å) | Relative intensity [100 × I/(Io)] (±30%) |
|---|---|---|
| 5.23 | 16.87 | 100 |
| 8.40 | 10.51 | 32 |
| 9.06 | 9.76 | 68 |
| 15.98 | 5.54 | 15 |
| 23.81 | 3.73 | 50 |

24.07 3.69 15

In one or more aspects, the trivalent element modified EMM-23 material comprising the composition of Formula II may have at least five or six XRD peaks selected from Table 4 or 4A. The trivalent element modified EMM-23 material comprising the composition of Formula II may have at least four, at least five, or six XRD peaks selected from Table 4 or 4A and a micropore volume greater than 0.15 cc/g (e.g., 0.15 to 0.30, 0.25 to 0.30 cc/g, or 0.20 to 0.30 cc/g), or a unit cell a-parameter of 19.6±0.5 Å and c-parameter of 13.5±0.5 Å.

The trivalent element modified EMM-23 material comprising the composition of Formula II may have at least four XRD peaks (degree 2-theta) selected from Table 5:

TABLE 5

| degree 2-theta (±0.20) | Relative intensity [100 × I/(Io)] (±30%) |
|---|---|
| 5.23 | 100 |
| 8.40 | 32 |
| 9.06 | 68 |
| 15.33 | 13 |
| 15.98 | 15 |
| 20.97 | 12 |
| 23.81 | 50 |
| 24.07 | 15 |
| 24.22 | 12 |
| 24.95 | 14 |

In one or more aspects, the trivalent element modified EMM-23 material comprising the composition of Formula II may have at least four XRD peaks with the degree 2-theta and d-spacing values selected from Table 5A, wherein the d-spacing values have a deviation determined based on the corresponding deviation ±0.20 degree 2-theta when converted to the corresponding values for d-spacing using Bragg's law:

TABLE 5A

| degree 2-theta (±0.20) | d-spacing (Å) | Relative intensity [100 × I/(Io)] (±30%) |
|---|---|---|
| 5.23 | 16.87 | 100 |
| 8.40 | 10.51 | 32 |
| 9.06 | 9.76 | 68 |
| 15.33 | 5.78 | 13 |
| 15.98 | 5.54 | 15 |
| 20.97 | 4.23 | 12 |
| 23.81 | 3.73 | 50 |
| 24.07 | 3.69 | 15 |
| 24.22 | 3.67 | 12 |
| 24.95 | 3.57 | 14 |

In one or more aspects, the trivalent element modified EMM-23 material comprising the composition of Formula II may have at least five, at least six, at least seven, at least eight, at least nine, or ten XRD peaks selected from Table 5 or 5A. The trivalent element modified EMM-23 material comprising the composition of Formula II may have at least four, at least, five, at least six, at least seven, at least eight, at least nine, or ten XRD peaks selected from Table 5 or 5A and a micropore volume greater than 0.15 cc/g (e.g., 0.15 to 0.30, 0.25 to 0.30 cc/g, or 0.20 to 0.30 cc/g), or a unit cell a-parameter of 19.6±0.5 Å and c-parameter of 13.5±0.5 Å.

The trivalent element modified EMM-23 material comprising the composition of Formula II may have at least four XRD peaks (degree 2-theta) selected from Table 6:

TABLE 6

| degree 2-theta (±0.20) | Relative intensity [100 × I/(Io)] (±30%) |
|---|---|
| 5.23 | 100 |
| 8.40 | 32 |
| 9.06 | 68 |
| 14.16 | 10 |
| 15.33 | 13 |
| 15.98 | 15 |
| 20.56 | 10 |
| 20.97 | 12 |
| 23.81 | 50 |
| 24.07 | 15 |
| 24.22 | 12 |
| 24.95 | 14 |

In one or more aspects, the trivalent element modified EMM-23 material comprising the composition of Formula II may have at least four XRD peaks with the degree 2-theta and d-spacing values selected from Table 6A, wherein the d-spacing values have a deviation determined based on the corresponding deviation ±0.20 degree 2-theta when converted to the corresponding values for d-spacing using Bragg's law:

TABLE 6A

| degree 2-theta (±0.20) | d-spacing (Å) | Relative intensity [100 × I/(Io)] (±30%) |
|---|---|---|
| 5.23 | 16.87 | 100 |
| 8.40 | 10.51 | 32 |

TABLE 6A-continued

| degree 2-theta (±0.20) | d-spacing (Å) | Relative intensity [100 × I/(Io)] (±30%) |
|---|---|---|
| 9.06 | 9.76 | 68 |
| 14.16 | 6.25 | 10 |
| 15.33 | 5.78 | 13 |
| 15.98 | 5.54 | 15 |
| 20.56 | 4.32 | 10 |
| 20.97 | 4.23 | 12 |
| 23.81 | 3.73 | 50 |
| 24.07 | 3.69 | 15 |
| 24.22 | 3.67 | 12 |
| 24.95 | 3.57 | 14 |

In one or more aspects, the material can have at least five, at least six, at least seven, at least eight, at least nine, at least ten, at least eleven, or twelve XRD peaks selected from Table 6 or 6A. The trivalent element modified EMM-23 material comprising the composition of Formula II may have at least four, at least five, at least six, at least seven, at least eight, at least nine, at least ten, at least eleven, or twelve XRD peaks selected from Table 6 or 6A and a micropore volume greater than 0.15 cc/g (e.g., 0.15 to 0.30, 0.25 to 0.30 cc/g, or 0.20 to 0.30 cc/g), or a unit cell a-parameter of 19.6±0.5 Å and c-parameter of 13.5±0.5 Å.

III. EMM-23 Materials with Different Concentrations of Silanol Species

As-made EMM-23 materials (e.g., modified or un-modified) may be prepared with different concentrations of silanol species. The environment of Si in the framework can be studied through various methods such as $^{29}$Si-NMR spectroscopy. The notations Q0, Q1, Q2, Q3, and Q4 are typically used in $^{29}$Si-NMR spectroscopy for Si with four oxygen atoms attached. The numbers 0-4 represent the number of Si units attached through the oxygen to an individual silicon atom. For example, in FIG. 13, the Q2 peak is at −88 ppm in the $^{29}$Si-NMR spectrum, the Q3 peak is at −99 ppm, and Q4 peaks are found from −108 to −120 ppm. $^{29}$Si-NMR spectroscopy allows for quantification of the amount of various silanol species in an EMM-23 material.

It has been observed that EMM-23 materials prior to thermal treatment (e.g., calcination) may have varying Q2, Q3 and Q4 contents. The amount of Q2 and Q3 content appears to be due to the different stages of maturation of crystalline product. For example, when preparing an as-made EMM-23 material (e.g., the composition of Formula IB or any other as-synthesized EMM-23 materials), stopping the preparation of EMM-23 (e.g., stopping the heating and tumbling in an autoclave) after 8, 10, and 21 days, the Q2 and Q3 contents are 12.8 and 37.4%, 11.2 and 31.4%, and 8.7 and 28.0%, respectively. After thermal treatment of such EMM-23 materials, the $^{29}$Si NMR of these materials possess Q2 and Q3 content indicating that these Q2 and Q3 silanols are not completely annealed. Dangling silanols from the lack of complete annealing during thermal treatment can allow other components to anchor to the framework like aluminum, which can provide activity and stability, and/or other materials that can provide catalytic activity. See examples provided herein for more details.

IV. General Features

An as-made EMM-23 (e.g., a material before thermal treatment to remove SDA) may be prepared from a mixture of sources of water, hydroxide ions, oxide of a tetravalent element Y, optionally a trivalent element X, and optionally a structure directing agent T.

For example, the molar ratios of these sources when present in Formula IB may be as follows:

$YO_2/X_2O_3$ may be at least 5 (e.g., at least 100, at least 1000, or all $YO_2$);

$H_2O/YO_2$ may be 0.5 to 50 (e.g., 2 to 10 or 14-40);

$OH^-/YO_2$ may be 0.1 to 1.0 (e.g., 0.2 to 0.5); and $T/YO_2$ may be 0.05 to 0.5 (e.g., 0.1 to 0.25).

In one or more aspects, the molar ratios of these sources when used to prepare the as-made EMM-23 that is subsequently thermally-treated to generate Formula III (which is then subjected to trivalent element treatment) may be as follows:

$YO_2/X_2O_3$ may be equal to or at least 75 (e.g., at least 100, at least 1000, or all $YO_2$);

$H_2O/YO_2$ may be 0.5 to 50 (e.g., 2 to 10 or 14-40);

$OH^-/YO_2$ may be 0.1 to 1.0 (e.g., 0.2 to 0.5); and $T/YO_2$ may be 0.05 to 0.5 (e.g., 0.1 to 0.25).

In one or more aspects, the as-made EMM-23 material may be prepared by mixing a trivalent element X source with a hydroxide solution of SDA, and then subsequently adding a tetravalent Y source to the mixture to form a base mixture of the components. Seeds of an EMM-23 material may be added to the base mixture. The solvent (e.g., water from the hydroxide solution, and optionally methanol and ethanol from the hydrolysis of silica sources) of the base mixture may be removed (e.g., by evaporation or freeze-drying) such that a desired solvent to $YO_2$ molar ratio is achieved for the resulting mixture. Water may be added to the resulting mixture to achieve a desired $H_2O/YO_2$ molar ratio when too much water is removed during the solvent removal process. The mixture is then sealed within a suitable reactor vessel, e.g., within a steel Paar autoclave. The sealed mixture is heated, optionally with tumbling or stirring, such that the sealed mixture is maintained at a temperature for a period of time sufficient for EMM-23 crystals to form (e.g., in a sealed autoclave placed in a convection oven maintained at 150° C. for 1 day to 14 days). Detailed procedures for the preparation of an as-made EMM-23 material can also be found in U.S. Pat. No. 9,205,416, which is incorporated herein by reference in its entirety.

Examples of sources of the tetravalent element Y may be selected from colloidal suspensions of silica, precipitated silica, fumed silica, alkali metal silicates, tetraalkyl orthosilicates (e.g., tetraethyl orthosilicates, tetramethyl orthosilicates, etc.) and germanium oxide. Examples of different sources of silica may include LUDOX® (e.g., LUDOX® AS-40) colloidal silica, ULTRASIL® precipitated silica, CARBOSPERSE™, fumed silica suspension, or a mixture thereof.

The trivalent element X may comprise or be aluminum and suitable sources of aluminum may be selected from hydrated alumina, aluminum hydroxide, alkali metal aluminates, aluminum alkoxides, and water-soluble aluminum salts, such as aluminum nitrate. Suitable sources of the structure directing agents may be selected from the hydroxides and/or salts of the relevant diquaternary ammonium compounds, e.g., 1,5-bis(N-propylpyrrolidinium)pentane dication, 1,6-bis(N-propylpyrrolidinium)hexane dication, 1,4-bis(N-methylpyrrolidinum)butane dication.

In one or more aspects, the mixture after solvent adjustment (e.g., where the desired water to silica molar ratio is achieved) may be mixed by a mechanical process such as stirring or high shear blending to assure suitable homogenization of the base mixture. For example, using a FlackTek speedmixer with a mixing speed of 1800 to 2200 rpm (e.g., 2000 rpm) can improve homogenization of the base mixture. Depending on the nature of the reagents in the base mixture, the amount of solvent (e.g., water) may be reduced in the mixture before crystallization to obtain the desired solvent molar ratio (e.g., $H_2O/YO_2$). Suitable methods for reducing the solvent (e.g., water) content may include evaporation under a static or flowing atmosphere such as ambient air, dry nitrogen, dry air, or by spray drying or freeze drying. In one or more aspects, using silica sources such as LUDOX® (e.g., LUDOX® AS-40), ULTRASIL®, CARBOSPERSE™, or a mixture thereof, with a mixing speed of 1800 to 2200 rpm (e.g., 2000 rpm), may produce a base mixture with the desired solvent molar ratio (e.g., $H_2O/YO_2$ molar ratio) without having to remove solvent from the base mixture. High mixing speeds such as 2000 rpm can produce homogenization of the mixture even when the mixture has a solvent molar ratio (e.g., $H_2O/YO_2$ molar ratio) of greater than 10 (e.g., 15 to 40).

Crystallization of an EMM-23 material in the formation of the as-made EMM-23 material may be carried out under static or stirred conditions in a suitable reactor vessel, such as for example, polypropylene jars or Teflon lined or stainless steel autoclaves placed in a convection oven maintained at a temperature of about 100 to about 200° C. for a period of time sufficient for crystallization to occur at the temperature used, e.g., from about 1 day to about 14 days. Thereafter, the solid crystals of the as-made EMM-23 material are separated from the liquid (e.g., by filtration or centrifugation) and recovered.

Part or all of the SDA when used during the synthesis of an as-made EMM-23 material may be removed to form the thermally-treated EMM-23 material. Removal of SDA may be carried out using thermal treatment (e.g., calcination) in which the as-made EMM-23 material is heated in an atmosphere selected from air, nitrogen, or a mixture thereof at a temperature sufficient to remove part or all of the SDA. While subatmospheric pressure may be employed for the thermal treatment, atmospheric pressure is desired for reasons of convenience. The thermal treatment may be performed at a temperature up to 650° C., e.g., from 400-600° C. The thermal treatment (e.g., calcination) may be carried out in a box furnace in dry air, which has been exposed to a drying tube containing drying agents that remove water from the air. The thermally-treated EMM-23 materials (e.g., the calcined product) can be useful in the catalysis of certain organic, e.g., hydrocarbon, conversion reactions.

EMM-23 materials (e.g., the as-made, calcined, modified, unmodified, or any other EMM-23 materials) can be combined with a hydrogenating component. The hydrogenating component may be selected from molybdenum, tungsten, rhenium, nickel, cobalt, chromium, manganese, or a noble metal, such as platinum or palladium where a hydrogenation-dehydrogenation function is to be performed. Such hydrogenating components may be incorporated into the composition by way of one or more of the following processes: cocrystallizing; exchanging into the composition to the extent a Group IIIA element, e.g., aluminum, is in the structure; impregnating therein; or physically admixing therewith. For example, such hydrogenating components may be impregnated into the EMM-23 material. In the case of platinum, the EMM-23 materials may be impregnated with a solution containing a platinum metal-containing ion. Suitable platinum compounds for impregnating may be selected from chloroplatinic acid, platinous chloride, and compounds containing a platinum amine complex.

EMM-23 materials (e.g., the as-made, calcined, modified, unmodified, or any other EMM-23 materials), when employed either as an adsorbent or as a catalyst, may be dehydrated, at least partially. Such dehydration may be accomplished by heating the material in a surrounding atmosphere at a temperature in the range of 200 to 370° C., the atmosphere may be selected from air, nitrogen, or a mixture thereof, and at atmospheric, subatmospheric or superatmospheric pressures for between 30 minutes and 48 hours. Dehydration may also be performed at room temperature by placing the EMM-23 materials in a vacuum; however, a longer period of time is required to obtain a sufficient amount of dehydration.

EMM-23 materials (e.g., the as-made, calcined, modified, unmodified, or any other EMM-23 materials) may be used as an adsorbent or in an aluminosilicate form, as a catalyst to catalyze a wide variety of organic compound conversion processes. Examples of chemical conversion processes, which are effectively catalyzed by the modified EMM-23 materials described herein, either alone or in combination with one or more other catalytically active substances (including other crystalline catalysts), include those requiring a catalyst with acid activity. Examples of organic conversion processes, which may be catalyzed by the modified EMM-23 materials described herein include cracking, hydrocracking, disproportionation, alkylation, oligomerization, and isomerization.

EMM-23 materials (e.g., the as-made, calcined, modified, unmodified, or any other EMM-23 materials) may be incorporated with another material resistant to the temperatures and other conditions employed in organic conversion processes. Such resistant materials may be selected from active materials, inactive materials, synthetic zeolites, naturally occurring zeolites, inorganic materials or a mixture thereof. Examples of such resistant materials may be selected from clays, silica, metal oxides such as alumina, or a mixture thereof. The inorganic material may be either naturally occurring, or in the form of gelatinous precipitates or gels, including mixtures of silica and metal oxides. Use of a resistant material in conjunction with an EMM-23 material, i.e., combined therewith or present during synthesis of the as-made EMM-23 crystal, which crystal is active, tends to change the conversion and/or selectivity of the catalyst in certain organic conversion processes. Inactive resistant materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions. Said inactive resistant materials, i.e., clays, oxides, etc., function as binders for the catalyst. A catalyst having good crush strength can be beneficial because in commercial use, it is desirable to prevent the catalyst from breaking down into powder-like materials.

Naturally occurring clays which may be composited with EMM-23 materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays may be used in the raw state as originally mined or initially subjected to calcination, acid treatment or chemical modification. Binders useful for compositing with EMM-23 materials also include inorganic oxides selected from silica, zirconia, titania, magnesia, beryllia, alumina, or a mixture thereof.

EMM-23 materials (e.g., the as-made, calcined, modified, unmodified, or any other EMM-23 materials) may be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia.

The relative proportions of EMM-23 material and inorganic oxide matrix may vary widely, with the EMM-23 material content ranging from about 1 to about 90 percent by weight, of the composite or, when the composite is prepared in the form of beads, in the range of about 2 to about 80 weight percent of the composite.

In one or more aspects, embodiments described herein using the language a "material comprising" with respect to a particular composition is meant to include a "material comprising or being" the particular composition.

As used herein, and unless otherwise specified, a numeric value or range of values may deviate to an extent deemed reasonable to one of ordinary skill in the relevant art. It is well known that instrument variation and other factors can affect the numerical values. Such deviation, unless otherwise specified, may be plus or minus 2%, 5%, 10%, 15%, 20%, 25%, or 30% of the numeric value or range of values indicated.

As used herein, the term "substantially free" refers to the materials described herein (e.g., modified EMM-23 materials) are at least 50%, at least 60%, at least 70%, at least 80%, at least 90%, at least 95%, at least 97%, or at least 99% (e.g., 99.5% or 99.9%) by weight pure EMM-23 material, based on the total weight of the composition, by quantification using XRD or NMR spectroscopy (e.g., by measuring the area or the relative intensity of the relevant peaks), or by other known methods appropriate for such determination. The remainder of the material is non-EMM-23 material, which may be structure directing agent, amorphous material, other impurities, or a mixture thereof.

As used herein, the term "crystalline" refers to a crystalline solid form of a material, including, but not limited to, a single-component or multiple-component crystal form, e.g., including solvates, hydrates, and a co-crystal. Crystalline can mean having a regularly repeating and/or ordered arrangement of molecules, and possessing a distinguishable crystal lattice. For example, crystalline EMM-23 can have different water or solvent content. The different crystalline lattices can be identified by solid state characterization methods such as by XRD (e.g., powder XRD). Other characterization methods known to a person of ordinary skill in the relevant art can further help identify the crystalline form as well as help determine stability and solvent/water content.

As used herein, the term "substantially crystalline" means a majority (greater than 50%) of the weight of a sample of a solid material described is crystalline and the remainder of the sample is a non-crystalline form. In one or more aspects, a substantially crystalline sample has at least 95% crystallinity (e.g., 5% of the non-crystalline form), at least 96% crystallinity (e.g., 4% of the non-crystalline form), at least 97% crystallinity (e.g., 3% of the non-crystalline form), at least 98% crystallinity (e.g., about 2% of the non-crystalline form), at least 99% crystallinity (e.g., 1% of the non-crystalline form), and 100% crystallinity (e.g., 0% of the non-crystalline form).

As used herein, the term "alpha value" refers to the catalytic activity of a material (e.g., the EMM-23 material described herein) measured by the ratio of the rate constant of a test sample for cracking normal hexane to the rate constant of a standard reference catalyst, which is an amorphous silica/alumina. See e.g., P. B. Weisz and J. N. Miale, J. Catalysis, 4 (1965) 527-529; and J. N. Miale, N. Y. Chen, and P. B. Weisz, J. Catalysis, 6 (1966) 278-287. For example, an alpha value of 1 means that the test sample and the reference standard have about the same activity. In one or more aspects, the modified EMM-23 material described herein e.g., a material comprising the composition of Formula II, may produce an alpha value of greater than 10.

The micropore volume of the modified EMM-23 materials described herein can be determined using methods known in the relevant art. For example, the materials can be measured with nitrogen physisorption, and the data can be analyzed by the t-plot method described in Lippens, B. C. et al., "Studies on pore system in catalysts: V. The t method", J. Catal., 4, 319 (1965), which describes micropore volume method and is incorporated herein by reference. Using such nitrogen physisorption method, the modified EMM-23 materials described herein may have a micropore volume of 0.15 to 0.30, 0.25 to 0.30 cc/g, or 0.20 to 0.30 cc/g.

The X-ray diffraction data reported herein were collected with a Panalytical X'Pert Pro diffraction system with an Xcelerator multichannel detector, equipped with a germanium solid state detector, using copper K-alpha radiation. The diffraction data were recorded by step-scanning at 0.02 degrees of two-theta, where theta is the Bragg angle, and using an effective counting time of 2 seconds for each step. The interplanar spacings, d-spacings, were calculated in Angstrom units, and the relative intensities of the lines, $I/I_o$ is the ratio of the peak intensity to that of the intensity of the strongest line, above background. The intensities are uncorrected for Lorentz and polarization effects. The interplanar spacings, d-spacings, were calculated in Angstrom units, and the relative peak area intensities of the lines, I/I(o), is one-hundredth of the intensity of the strongest line, above background, were determined with the MDI Jade peak profile fitting algorithm. It should be understood that diffraction data listed as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

Aspects of the disclosure are described in greater detail by way of specific examples. The following examples are offered for illustrative purposes, and are not intended to limit the disclosure in any manner. Those of skill in the relevant art will readily recognize a variety of parameters can be changed or modified to yield essentially the same results.

EXAMPLES

Example 1

Studies of Modifying As-Made EMM-23 with Acids

Thermal treatment (e.g., calcination) is used to remove the structure directing agent (SDA) from a EMM-23 material. It has been observed that such thermal treatment of EMM-23 materials leads to partial amorphitization of the material. To avoid or reduce the extent of amorphitization, alternative methods to remove the organic SDA from EMM-23 were carried out. It has been shown that ozone could be used at 150° C. to remove the SDA, but this method can be difficult to apply reproducibly to large quantities of sample. This study explores heating the all-silica, as-made EMM-23 material in various acids to remove the SDA. The as-made EMM-23 materials used in this example can be prepared according to the procedures described in U.S. Pat. No. 9,205,416.

In one experiment, the as-made, all-silica EMM-23 (no $X_2O_3$ added) was heated in concentrated HCl in a sealed autoclave placed in a convection oven overnight, where the temperature of the oven was maintained at 150° C. The material was then recovered by filtration and washed with deionized water. A powder XRD pattern of the resulting sample showed significant changes when compared with that of the parent sample (i.e., the sample without treatment). See FIG. 1 (pattern I corresponds to the EMM-23 treated in ozone; pattern II corresponds to the parent (un-treated) EMM-23; and pattern III corresponds to EMM-23 heated in HCl). The pattern of the HCl treated sample was also distinct from that of the sample that was treated with ozone to remove the SDA. A thermogravimetric analysis (TGA) of the acid-treated sample showed a mass loss compared to that of the parent as-made EMM-23 sample. The TGA data indicated that the SDA was still occluded inside the framework after the acid treatment. EMM-23 has silanol and siloxy groups. The structure of EMM-23 permits the passage of cations and anions even in the as-made form with occluded organocations (e.g., SDA). Because the siloxy groups are basic, they can accept protons to become silanols. Charge balance requires that the conjugate base of the acid remain as an extraframework species to compensate the charge of the organocation (e.g., SDA). See Scheme 1.

Scheme 1

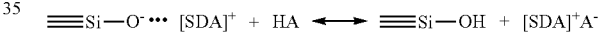

Figure 2:
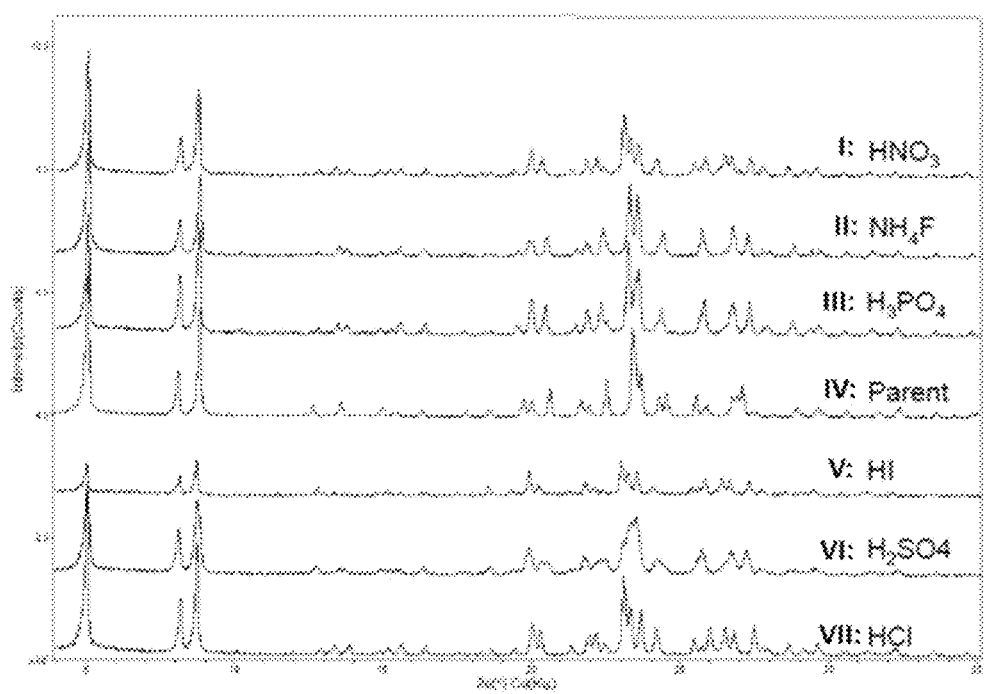
FIG. 2 shows powder XRD patterns of as-made modified EMM-23 treated with various acids.

Additional experiments were carried out using various acids. Parent as-made EMM-23 was treated with different acids under similar overnight conditions at 150° C. FIG. 2 compares the powder XRD pattern of a parent as-made EMM-23 material with the modified EMM-23 materials treated with various acids (pattern I corresponds to $HNO_3$; pattern II corresponds to $NH_4F$; pattern III corresponds to $H_3PO_4$; pattern IV corresponds to the parent material; pattern V corresponds to HI; pattern VI corresponds to $H_2SO_4$; and pattern VII corresponds to HCl). Individual patterns are distinct from one another with respect to both the relative peak intensities and the peak positions. Table B shows the indexed hexagonal cell parameters for the respective samples. In every case (except sulfuric acid), there is an increase in the a-parameter and a decrease in the c-parameter of the hexagonal cell of the EMM-23 materials. These changes are manifested in the shifts of the positions of the 110 peak (sensitive to changes in the a-parameter) and 101 peak (sensitive to changes in both the a- and c-parameters, but more so to the c parameter). See FIG. 3, which shows powder XRD patterns of acid-treated EMM-23 in low-angle range (pattern I corresponds to $HNO_3$; pattern II corresponds to $NH_4F$; pattern III corresponds to $H_3PO_4$; pattern IV corresponds to the parent material; pattern V corresponds to HI; pattern VI corresponds to $H_2SO_4$; and pattern VII corresponds to HCl).

The data in Table B show that the measured anion charge/N ratio is close to 1 for Cl and I. The measured Cl/N and I/N atomic ratios are 0.9 and 1.2, respectively, while the S/N and P/N atomic ratios are 0.40 and 0.30, respectively. If these anions are occluded in protic forms, then the uptake of these species is lower than the theoretical maximum based upon charge balance considerations.

Figure 4:
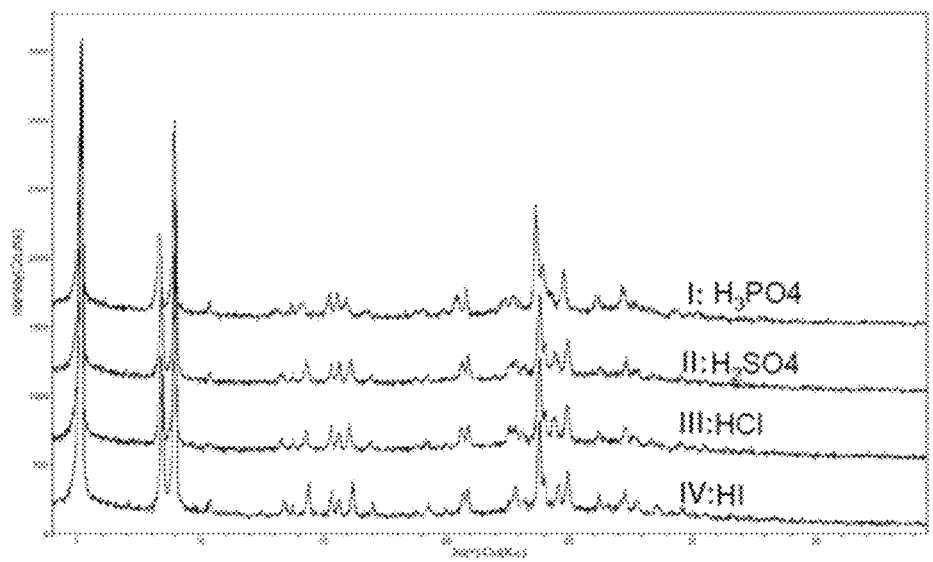
FIG. 4 shows powder XRD patterns of modified EMM-23 treated with acid after calcination to 540° C.
Figure 5:
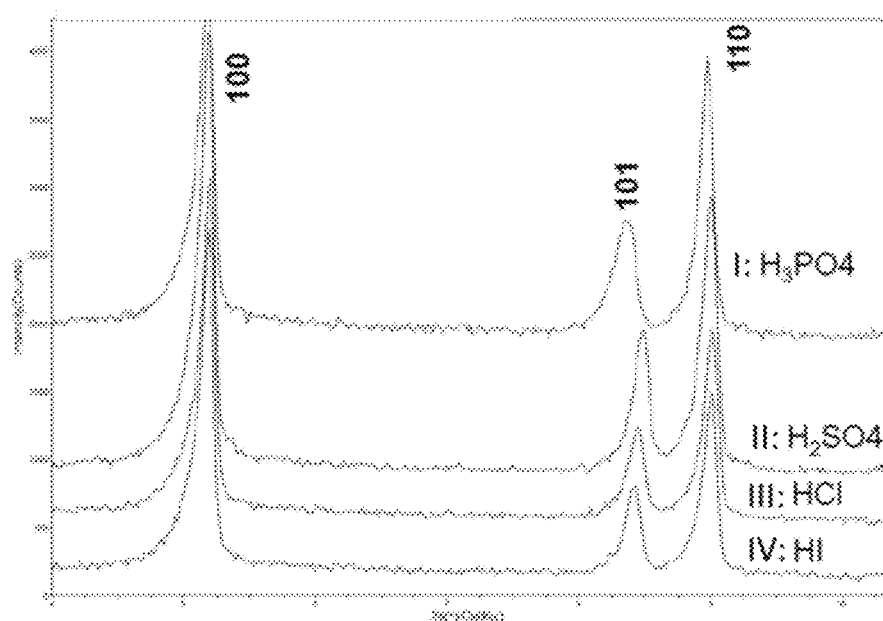
FIG. 5 shows an expansion of FIG. 4 in low-angle range.

FIG. 4 shows the powder XRD patterns of the different acid-treated all-silica EMM-23 samples after calcination to 540° C. in a box furnace for 2 hours in dry air, which has been exposed to a drying tube containing drying agents that remove water from air (pattern I corresponds to $H_3PO_4$; pattern II corresponds to $H_2SO_4$, pattern III corresponds to HCl, and pattern IV corresponds to HI). The phosphoric acid-treated EMM-23 sample shows significant differences when compared against the other acid-treated EMM-23 samples. FIG. 5 (pattern I corresponds to $H_3PO_4$; pattern II corresponds to $H_2SO_4$, pattern III corresponds to HCl, and pattern IV corresponds to HI) shows that the 101 peak of the calcined phosphoric acid-treated EMM-23 sample is at lower angle while the 100 and 110 peaks remain at similar positions as compared to the other acid-treated EMM-23 samples. Table A includes a listing of the powder XRD peaks measured for the calcined phosphoric acid treated EMM-23 material. See also Table B for the hexagonal unit cell parameters. The c-parameter of the calcined phosphoric acid-treated EMM-23 sample is larger in this material than it is in the calcined versions of the other acid-treated EMM-23 samples, suggesting that phosphorus atoms have been incorporated into the framework. It is believed that the phosphorus atoms are incorporated into the framework during the thermal treatment (e.g., calcination). It is also believed that the phosphorus atom incorporated into the framework of the modified EMM-23 material decreases the extent of the shrinking of the unit cell along the c-direction of the hexagonal cell by occupying the vacancy sites in the position along the cusps of the tri-lobe pores present in the EMM-23 material. In the absence of an atom filling these positions, opposing silanols can condense and thereby reduce the local distance between them along the c-axis. Elemental analysis of the phosphoric acid-treated EMM-23 sample shows that the P content decreases only slightly, from 1.13 to 1.01%, after calcination at 540° C.

TABLE A

Listing of XRD peaks for calcined phosphoric acid treated EMM-23

| degree 2-Theta | d-spacing (Å) | I/Io (area %) |
|---|---|---|
| 5.14 | 17.18 | 100 |
| 8.32 | 10.62 | 50 |
| 8.94 | 9.88 | 76 |
| 10.36 | 8.54 | 4 |
| 13.12 | 6.74 | 9 |
| 13.71 | 6.45 | 5 |
| 14.12 | 6.27 | 13 |
| 15.21 | 5.82 | 13 |
| 15.57 | 5.69 | 11 |
| 15.92 | 5.56 | 11 |
| 16.71 | 5.30 | 3 |
| 19.00 | 4.67 | 3 |
| 19.89 | 4.46 | 1 |
| 20.42 | 4.35 | 12 |
| 20.80 | 4.27 | 10 |
| 22.36 | 3.97 | 11 |
| 22.71 | 3.91 | 7 |
| 22.98 | 3.87 | 4 |
| 23.66 | 3.76 | 54 |
| 23.91 | 3.72 | 25 |
| 24.21 | 3.67 | 15 |
| 24.77 | 3.59 | 23 |
| 26.11 | 3.41 | 10 |
| 27.15 | 3.28 | 12 |
| 29.19 | 3.06 | 2 |
| 29.37 | 3.04 | 4 |
| 29.87 | 2.99 | 2 |
| 30.24 | 2.95 | 6 |

To assess the acid strength of the modified EMM-23 material treated with the phosphoric acid, the calcined version of the phosphoric acid-treated EMM-23 sample was subjected to the McVicker test with 2-methylpent-2-ene as the probe molecule. See Kramer and McVicker, Acc. Chem. Res. 19 (1986) 78, which describes the McVicker test method and is incorporated herein by reference. While the phosphoric acid-treated EMM-23 sample did not exhibit strong acidity, it was active for double-bond shifts. This is consistent with the presence of weak acidity or basicity in the phosphoric acid-treated EMM-23 sample. An untreated all-silica calcined EMM-23 material does not show activity in this test. Likewise, a calcined HCl-treated all-silica EMM-23 sample showed no activity. These observations are consistent with the notion that the phosphate fills vacancy sites in the framework of EMM-23. It is believed that in filling an empty Q3 site, the phosphate can condense with three silanol species to leave an unbonded P=O species.

In another experiment, a sample of the phosphoric acid-treated EMM-23 was exposed to ozone at 175° C. for 6 hours followed by a further 2-hour ozone treatment at 200° C. to remove the SDA. In contrast to the phosphoric acid-treated EMM-23 sample that was calcined at 540° C., the position of the 101 peak does not change much when compared to the calcined versions of the other non-phosphoric acid-treated EMM-23 samples. However, unlike the calcined versions of the acid-treated EMM-23 samples, this ozone treated sample was active for methyl shifts in the McVicker test with 2-methylpent-2-ene, indicating a stronger acidity than that of the phosphoric acid-treated EMM-23 sample and the other acid-treated EMM-23 samples calcined to 540° C. The sample of the phosphoric acid-treated EMM-23 exposed to ozone was heated at a lower temperature than the calcined samples, and the occluded phosphate ions were not believed to have been condensed with the silanol species in the ozone treated sample. This is consistent with the observation that the ozone treated sample has a stronger acidity.

TABLE B

Hexagonal Unit cell parameters and composition of as-made modified EMM-23 treated with different acids

| acid | a (Å) | c (Å) | N wt % | Anion wt % | A/N atomic ratio | Si wt % |
|---|---|---|---|---|---|---|
| Parent (no acid) | 19.78 | 13.89 | | | | |
| HCl | 20.16 | 13.71 | 1.87 | 4.15 Cl | Cl/N = 0.90 | 32.10 |
| $H_2SO_4$ | * | * | 1.82 | 1.61 S | S/N = 0.40 | 32.00 |
| HI | 20.25 | 13.81 | 1.67 | 17.7 I | I/N = 1.2 | 29.10 |
| $H_3PO_4$ | 20.02 | 13.79 | 1.76 | 1.13 P | P/N = 0.30 | 31.70 |
| $HNO_3$ | 20.19 | 13.79 | | | | |

* The sample treated with sulfuric acid shows broad patterns. This is not due to amorphization as no amorphous silica hump is manifested in the pattern. There may be disorder in this sample due to a strong interaction of the occluded sulfate species with the silanols of the framework and that the sulfate either occupies multiple crystallographic positions or it only partially occupies a certain position.

Example 2

Studies of Modifying As-Made EMM-23 with Salts

Figure 3:
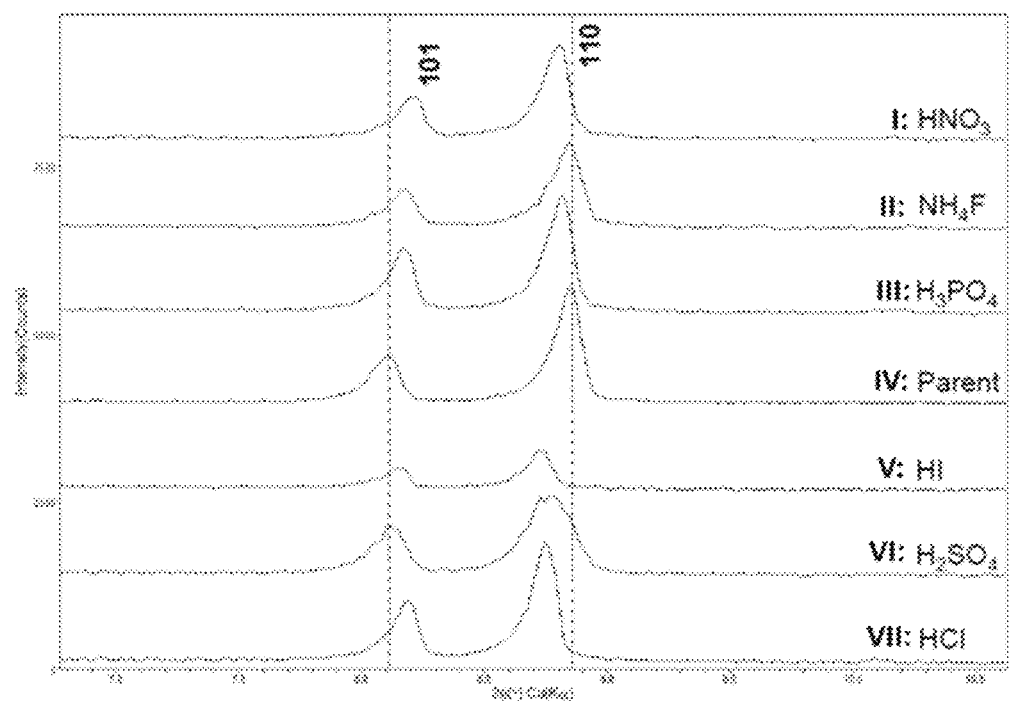
FIG. 3 shows an expansion of FIG. 2 in low-angle range.

This study was carried out to explore treatment of as-made EMM-23 with ammonium salts. In one experiment, an as-made, all-silica EMM-23 was refluxed overnight in ammonium chloride. The as-made, all-silica EMM-23 material can be prepared according to the procedures described in U.S. Pat. No. 9,205,416. In another experiment, the as-made, all-silica EMM-23 material was refluxed overnight with ammonium fluoride. FIGS. 2 and 3 show the differences of between ammonium fluoride treated sample with respect to the parent as-made (un-treated) EMM-23 sample. The parent sample (no salt treatment) has a unit cell a-parameter of 19.78 Å and c-parameter of 13.89 Å, and the sample treated with $NH_4F$ has an a-parameter of 19.97 Å and c-parameter of 13.83 Å. The $NH_4F$ treated sample showed 0.44 F wt %, and Si/F atomic ratio of 51; the $NH_4Cl$ sample showed 1.79 N wt %, 0.92 Cl wt %, 31.90 Si wt %, and Cl/N atomic ratio of 0.20.

In one experiment, an as-made, all-silica EMM-23 sample was refluxed in a solution of perrhenic acid for 3 hours. The powder XRD patterns showed no changes after the treatments, which suggests that the perrhenate is too large to allow its entrance at these conditions. Another as-made, all-silica EMM-23 sample was also heated with ammonium perrhenate at 150° C. in a convection oven. Again, no changes in the powder XRD pattern were observed. The size of the perrhenate anion prevents its occlusion under the conditions of this treatment.

Example 3

Ion Exchange of EMM-23

The ability of the acid-treated, modified EMM-23 material to perform anion-exchanges was explored. First, a Cl-EMM-23 material was prepared by heating an as-made, all silica EMM-23 material in an HCl solution in a sealed autoclave placed in a convection oven maintained at 150° C. The as-made, all-silica EMM-23 material can be prepared according to the procedures described in U.S. Pat. No. 9,205,416. Two portions of the Cl-EMM-23 material were heated overnight (16 hours) in either a solution of KI or $NaBrO_3$ in a sealed autoclave placed in a convection oven maintained at 150° C.

The resulting KI-treated sample had an I/N atomic ratio of 0.25 and a Cl/N atomic ratio of 0.06. The powder XRD pattern of the treated sample appeared to show signs of amorphitization in the mid-angle regions of the powder XRD pattern (data not shown). The powder XRD pattern of the sample treated overnight with sodium bromate appeared to be amorphitized to a greater extent than that treated with the KI (data not shown).

Figure 6:
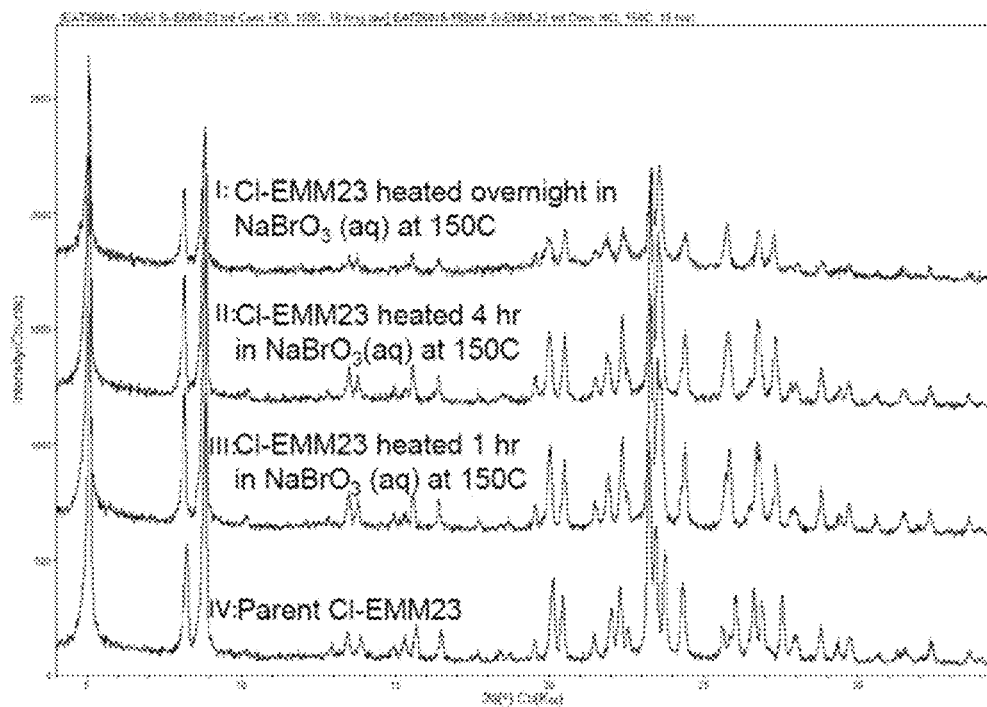
FIG. 6 shows powder XRD patterns of Cl-EMM-23 (modified EMM-23) heated in a NaBrO$_3$ for different periods of time

The $NaBrO_3$ experiments were repeated except that the exposure time was reduced to 4 hours and to 1 hour, respectively. The powder XRD patterns of these materials showed less amorphitization; the relative intensities within the pattern suggest that the non-amorphitized EMM-23 component of the final ion exchanged, acid-treated EMM-23 material is similar for each of the treated materials, but they are different from the parent acid-treated Cl-EMM-23 material. See FIG. 6 (pattern I corresponds to Cl-EMM-23 heated overnight in $NaBrO_3$ (aq) at 150° C., pattern II corresponds to Cl-EMM-23 heated for 4 hours in $NaBrO_3$ (aq) at 150° C.; pattern III corresponds to Cl-EMM-23 heated for 1 hour in $NaBrO_3$ (aq) at 150° C.; and pattern IV corresponds to parent Cl-EMM-23). These experiments also suggest that the ion-exchange may occur rapidly within the first few hours.

The integrity of the final ion exchanged, acid-treated EMM-23 material is reflected in the N content of the product. The N content of the starting as-made, acid-treated EMM-23 material is about 1.80%, but after the overnight ion exchange treatment with $NaBrO_3$, the nitrogen content was reduced to 0.90%. For the sample treated for 4 hours with $NaBrO_3$, the N content dropped only to 1.44%. The Br/N atomic ratio of each of the ion exchange treated samples with sodium bromate is constant at 0.15-0.16 for the 16 hour and 4 hour ion exchanges. See Table C. The constant Br/N atomic ratio suggests that (at these conditions) the materials are not kinetically limited in the extent of the exchange with the bromate.

TABLE C

Compositions of as-made, acid-treated EMM-23 after ion exchange

| Material | N wt % | Anion wt % | A/N atomic ratio | Si wt % |
|---|---|---|---|---|
| Cl-EMM-23 ion exchanged with KI | 1.49 | 0.23 Cl, 3.34 I | I/N = 0.25, Cl/N = 0.06 | 30.20 |
| Cl-EMM-23 ion exchanged with $NaBrO_3$ 16 hrs | 0.90 | 0.08 Cl, 0.78 Br | Br/N = 0.15 | 35.30 |
| Cl-EMM-23 ion exchanged with $NaBrO_3$ 4 hrs | 1.44 | 0.14 Cl, 1.28 Br | Br/N = 0.16 | 33.80 |

Example 4

Figure 10:
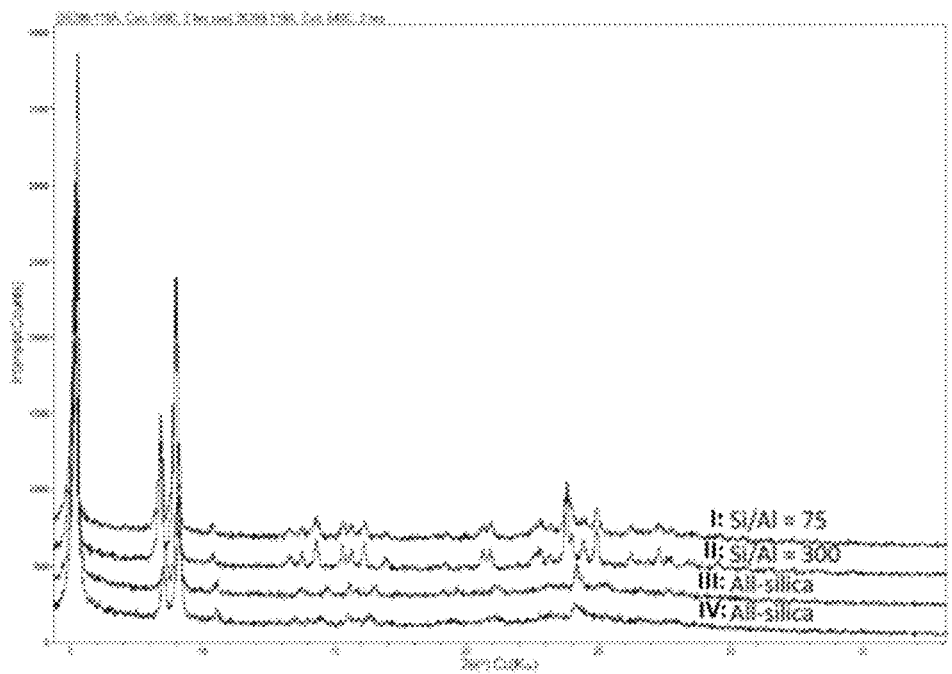
FIG. 10 shows powder XRD patterns of calcined modified EMM-23 prepared with varying concentrations of aluminum

Studies of Modifying Thermally-Treated EMM-23 Using Post-Synthetic Trivalent Element Incorporation It has been shown that EMM-23 materials containing aluminum as compared to EMM-23 materials with all-silica are generally more stable, e.g., during calcination. FIG. 10 (pattern I shows atomic ratio Si/Al=75; pattern II shows atomic ratio of Si/Al=300; pattern III corresponds to an all silica sample; pattern IV corresponds to an all silica sample) compares the powder XRD patterns of EMM-23 of different compositions after they have been calcined at 540° C. in a box furnace in dry air. The data demonstrate that the structural integrity of the materials with aluminum is better maintained when transitioning from the as-made material to the thermally-treated material than those of the all-silica materials as judged by the intensities of the peaks in the XRD. Incorporation of aluminum during the synthesis of EMM-23 (e.g., atomic ratio of Si/Al<75) can be difficult. This study explores various methods of incorporating ions into thermally-treated (e.g., calcined) EMM-23 materials. In some experiments described below, the starting EMM-23 material is the calcined all-silica material or calcined with a small amount aluminum (e.g., like the parent sample).

In experiment A, 0.75 g of a calcined, all-silica EMM-23 material was added to 15 mL of a 1M $Al(NO_3)_3$ solution. The calcined, all-silica EMM-23 material can be prepared according to the procedures described in U.S. Pat. No. 9,205,416. The initial pH of the aluminum nitrate solution was 2.4. After addition of the calcined, all-silica EMM-23 material, the pH dropped to between 1 and 1.5. The drop in pH is consistent with the release of protons as aluminum reacts with the silanol groups. Drops of concentrated ammonium hydroxide were then added to bring the pH back to between 2.4 to 2.6, and the resulting EMM-23 material was isolated from the suspension the following day after remaining at ambient temperature.

A similar experiment (experiment B) was repeated except that there was no pH adjustment after the addition of the calcined EMM-23 material to the aluminum nitrate solution. Experiments C and D were repeated similar to experiment A except that they were heated in an autoclave overnight placed in a convection oven maintained at 160 and 100° C., respectively, after the pH had been adjusted.

Figure 7:
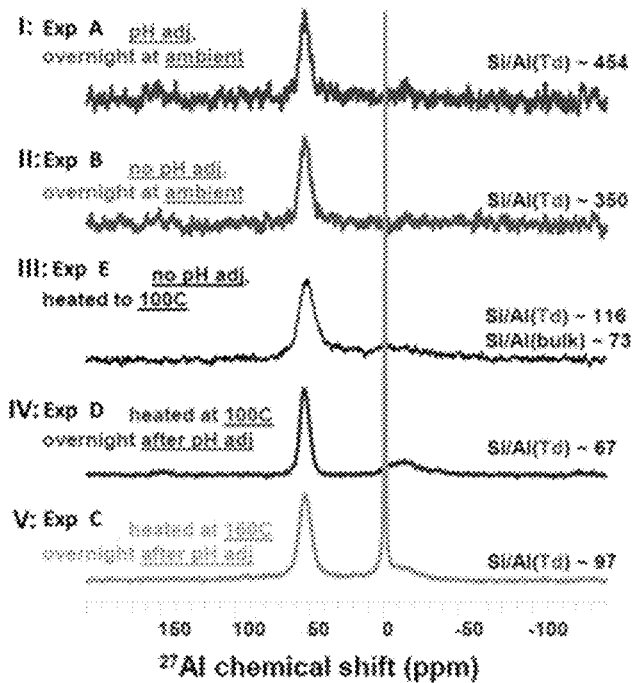
FIG. 7 shows $^{27}$Al MAS NMR spectra of modified EMM-23 after post-calcination insertion of aluminum at various conditions.

$^{27}$Al MAS NMR (Magic Angle Spinning Nuclear Magnetic Resonance) spectroscopy was used to evaluate and quantify insertion of Al to the framework. FIG. 7 shows the $^{27}$Al MAS NMR of the products of each of these experiments (spectrum I corresponds to Experiment A, which was pH adjusted, overnight at ambient temperature; spectrum II corresponds to Experiment B, which was not pH adjusted, overnight at ambient temperature; spectrum III corresponds to Experiment E, which was not pH adjusted, heated at 100° C.; spectrum IV corresponds to Experiment D, which was heated at 100° C. overnight after pH adjusted; and spectrum V corresponds to Experiment C, which was heated at 160° C. overnight after pH adjusted), and Table D summarizes the quantitation of their respective spectra. The spectra for the non-heated samples show that a small concentration of aluminum is incorporated as a tetrahedral species; the Si/Al$_{Td}$ atomic ratios were 454 and 350 for the pH-adjusted and non-pH adjusted samples, respectively. After heating overnight at 100 and 160° C., the Si/Al$_{Td}$ atomic ratios are 67 and 97, respectively. Also note that there are octahedral and, in some cases (e.g., in experiment E) pentacoordinated aluminum species. In particular, the sample heated at 160° C. shows a sharp octahedral aluminum signal that is assigned to an Al species in highly symmetric environments. These experiments show that the temperature of the treatment has an influence on the degree of incorporation of aluminum.

TABLE D

Results of aluminum quantitation for the calcined, all-silica EMM-23 treated post-calcination with aluminum nitrate solution using $^{27}$Al NMR

| Experiment name | pH adjustment (no of times) | Temperature | Si/Al (Td) | Si/Al (bulk) |
|---|---|---|---|---|
| Parent (untreated) | n/a | n/a | 518 | |
| A | Yes (1×) | Ambient | 454 | |
| B | No | Ambient | 350 | |
| E | No | 100° C. | 116 | 73 |
| C | Yes (1×) | 160° C. | 97 | |
| D | Yes (1×) | 100° C. | 67 | |
| C' | Yes (2×) | 100° C. | 47 | 37 |
| D' | Yes (1×) | 150° C. | 54 | 42 |

The Al-insertion experiments C and D were repeated with a slight modification: in one case (Experiment C'), the EMM-23 material was refluxed at 100° C. in Al(NO$_3$)$_3$ solution overnight and in the other (Experiment D'), the treatment was at 150° C. overnight. These experiments were carried out in an autoclave placed in a convection oven maintained at the temperatures indicated above. These treatments were performed as above except that multiple pH adjustments (as shown in the Table D) were carried out after consecutive refluxing treatments or heating treatments until there was no longer a pH change. For the Experiment C' sample that was refluxed, two pH adjustments were carried out before there was no longer a pH change, whereas the Experiment D' sample heated at 150° C. required only one pH adjustment.

Figure 8:
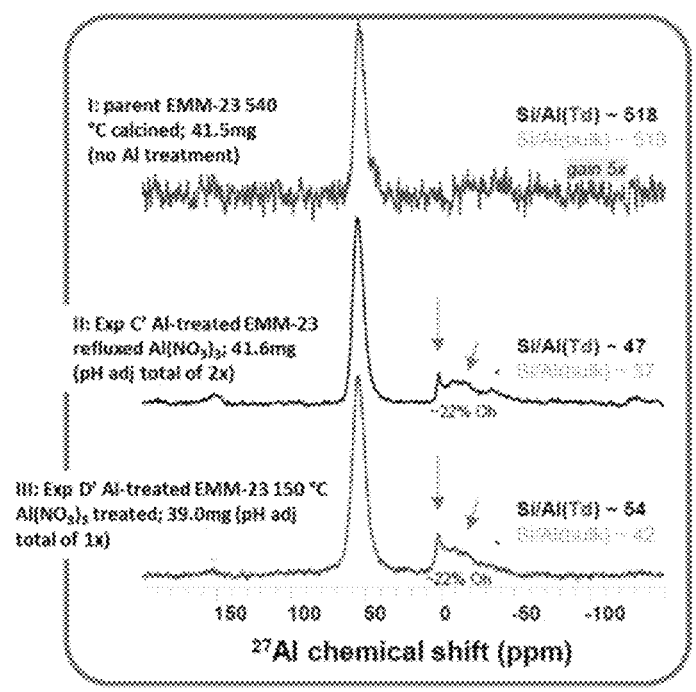
FIG. 8 shows $^{27}$Al MAS NMR spectra of modified EMM-23 after post-calcination insertion of aluminum at high temperature with pH adjustment

FIG. 8 (spectrum I corresponds to the parent EMM-23 calcined to 540° C. with no aluminum treatment; spectrum II corresponds to Experiment C', where EMM-23 was refluxed in Al(NO$_3$)$_3$ and the pH was adjusted two times; and spectrum III corresponds to Experiment D', where EMM-23 was heated in Al(NO$_3$)$_3$ at 150° C. and the pH was adjusted once) illustrates that there is incorporation of Al into the calcined EMM-23 material: from Si/Al(Td) from 518 (parent, untreated) to 47 (refluxed ~100° C.), to 54 (150° C. treated). In both of the latter samples (Experiments C' and D'), there is about 20% of Al species in an octahedral environment that may or may not be attached to the framework; notice that there is no sharp Al species as observed for the 160° C. treated sample of Experiment C (FIG. 7). The samples treated at the higher temperatures have less aluminum incorporation. This may be that while the kinetics of aluminum incorporation are faster at higher temperatures, the degradation of the zeolite probably proceeds at a faster rate at the higher temperatures. Indeed, the material refluxed at 100° C. remains more crystalline than that heated at 160° C. overnight (data not shown). A similar trend is noted in FIG. 8, where the treated samples at the higher temperatures have less aluminum incorporation. While heating is necessary for the aluminum incorporation, the ideal temperature which balances aluminum incorporation versus structural damage may be lower than that of the reflux conditions. Table E shows the powder XRD peaks for Experiment C'—Al treated EMM-23 at reflux (100° C.).

TABLE E

List of XRD peaks for Al-treated EMM-23 reflux (100° C.)

| Degree 2-Theta | d (Å) | I/Io (Area %) |
|---|---|---|
| 5.23 | 16.87 | 100 |
| 8.40 | 10.51 | 32 |
| 9.06 | 9.76 | 68 |
| 10.46 | 8.45 | 2 |
| 13.14 | 6.73 | 4 |
| 13.83 | 6.40 | 4 |
| 14.16 | 6.25 | 10 |
| 15.33 | 5.78 | 13 |
| 15.68 | 5.65 | 6 |
| 15.98 | 5.54 | 15 |
| 19.06 | 4.65 | 9 |
| 20.01 | 4.43 | 4 |
| 20.44 | 4.34 | 3 |
| 20.56 | 4.32 | 10 |
| 20.97 | 4.23 | 12 |
| 22.44 | 3.96 | 7 |
| 22.87 | 3.89 | 5 |
| 23.08 | 3.85 | 7 |
| 23.81 | 3.73 | 50 |
| 24.07 | 3.69 | 15 |
| 24.22 | 3.67 | 12 |
| 24.81 | 3.59 | 7 |
| 24.95 | 3.57 | 14 |
| 26.28 | 3.39 | 7 |
| 26.51 | 3.36 | 4 |
| 27.84 | 3.20 | 3 |
| 27.99 | 3.18 | 3 |
| 30.07 | 2.97 | 2 |
| 30.39 | 2.94 | 2 |
| 32.56 | 2.75 | 0.3 |
| 32.92 | 2.72 | 2 |
| 33.18 | 2.70 | 1 |

Nitrogen physisorption and alpha value tests, as described herein, were carried out on a sample refluxed in aluminum nitrate solution at 100° C. The material had 0.26 cc/g micropore volume and an alpha value of 33, which is higher than previously-measured alpha value for an aluminosilicate EMM-23 sample (made via direct synthesis; parent sample without treatment) of 10.

Figure 9:
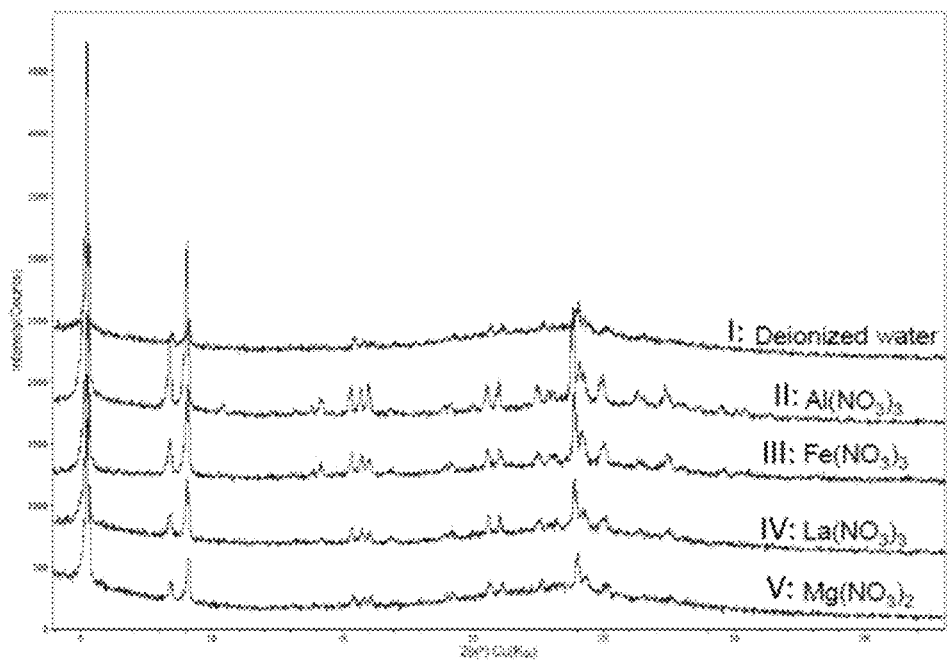
FIG. 9 shows powder XRD patterns of calcined modified EMM-23 heated overnight in different metal-containing solutions

Incorporation studies with other metal species were carried out. Calcined, all-silica EMM-23 samples were heated overnight at 100° C. in 1M solutions of either magnesium nitrate, lanthanum nitrate, iron nitrate, or aluminum nitrate. FIG. 9 shows the powder XRD pattern of each of the treated samples (pattern I corresponds to heating in deionized water; pattern II corresponds to $Al(NO_3)_3$; pattern III corresponds to $Fe(NO_3)_3$; pattern IV corresponds to $La(NO_3)_3$; and pattern V corresponds to $Mg(NO_3)_2$). There is amorphitization that occurs in the lanthanum and magnesium-treated samples as can be seen in the amorphous background at about 20 to about 25 degrees 2-theta. The iron and the aluminum-treated samples maintain much of their crystallinity. Both aluminum and iron can form tetrahedral species within a zeolite framework, but magnesium and lanthanum generally do not form stable tetrahedral species within a siliceous framework.

It is believed that the incorporation of aluminum and iron stabilizes the calcined material toward amorphitization induced by hot water because they can occupy the tetrahedral vacancy sites of the framework. Indeed, heating the parent calcined, all-silica EMM-23 material overnight at 100° C. shows amorphitization to an even larger degree than either the magnesium or lanthanum-treated samples. See FIG. 9, note the amorphous background at about 20 to about 25 degrees 2-theta. Not only do the aluminum treatments provide a route to introduce acidity, but they also help stabilize the materials against hydrolysis by water.

Example 5

Preparation of EMM-23 Using Different Mixing Speeds

Typically, an EMM-23 material is synthesized using a mixture of sources of water, hydroxide ions, oxide of a tetravalent element, optionally a trivalent element, and a structure directing agent. The mixture is generally a gel and the texture of the gel makes it difficult to obtain a uniformly homogenized suspension. This study shows that changing the mixing speed used to mix the reagents during synthesis of an EMM-23 material can improve homogenization. A FlackTek speedmixer with a mixing speed of 2000 rpm was used to achieve an improved homogenization. Such a high-speed mixer provides a more uniform gel than the one obtained by magnetic stirring, and the gel also possesses improved fluidity.

In one experiment, the FlackTek speedmixer was used in two parallel reactions carried out in 23-mL reactors. Both gave pure as-made EMM-23 products after 7 days of heating at 150° C. under static conditions. With the same mode of mixing, pure as-made, all-silica EMM-23 material was obtained in a 125-mL autoclave after 10 days of heating at 150° C. under tumbling conditions. Likewise, three additional parallel preparations at atomic ratio of Si/Al=300 in 23-mL Parr bombs each gave pure EMM-23 after heating for 10 days at 150° C. under tumbling conditions. These samples were sealed in an autoclave placed in a convection oven, where the temperature as indicated above was maintained.

Using a similar mode of mixing the gel prior to heating, as-made, all-silica EMM-23 material was obtained in a 300-mL reactor with a spiral mixing mechanism. A repeat of this synthesis with spiral blades produced a mixture of as made, all-silica EMM-23 material with trace ZSM-5 after 7 days of heating at 150° C. under tumbling conditions. Overall, reproducibility greatly improved with this spiral mixing method. In comparison, when the same synthesis was repeated in a 300-mL reactor with previous mode of mixing the initial gel with Harbil 5G-HD paint shaker, after 7 days of synthesis, the product was completely amorphous by XRD; a mixture of ZSM-5 and EMM-23 after 12 days of heating was obtained.

In one experiment, aluminosilicate syntheses (Si/Al atomic ratio=50, 60, 75) using the high-speed mixer were carried out. After the gels were heated for 7 days at 150° C. in tumbled 23-mL Parr bombs, only one product appeared to be pure as-made EMM-23 material by XRD; in the other syntheses, there was a minor beta impurity by XRD and the SEM images of the products showed minor amorphous or beta impurity. In another experiment, the amount of aluminum in the syntheses was reduced (Si/Al atomic ratio=75, 100, and 125) and the heating time was increased to 10 days. After 10 days of heating at 150° C., each preparation gave pure as-made EMM-23 material. Yet, in another experiment, three parallel reactions in 23-mL reactors at Si/Al atomic ratio=75 were carried out. One of the products appeared to be pure as-made EMM-23 material by powder XRD and the other two appeared to have minor beta and/or amorphous material.

Example 6

Using Various Silica Sources for EMM-23

The silica sources for synthesizing EMM-23 materials are typically tetraethylorthosilicate (TEOS) or tetramethylorthosilicate (TMOS). It is known in the relevant art that other more conventional silica sources such as LUDOX® AS-40 colloidal silica and ULTRASIL® precipitated silica can generate impurity such as ZSM-5 and amorphous materials. This study is carried out to explore using more conventional silica sources for the synthesis of EMM-23 materials in combination with FlackTek speedmixer at a mixing speed of 2000 rpm and/or longer digestion period for the silica sources (e.g., longer mixing time with hydroxide sources to de-polymerize the silica source).

A series of seeded experiments were carried out using different silica sources, including ULTRASIL® precipitated silica, LUDOX® AS-40 colloidal silica, or CABOS-PERSE™ fumed-silica suspension under conditions in which either (1) no water was removed or (2) water was removed by freeze-drying.

Figure 11:
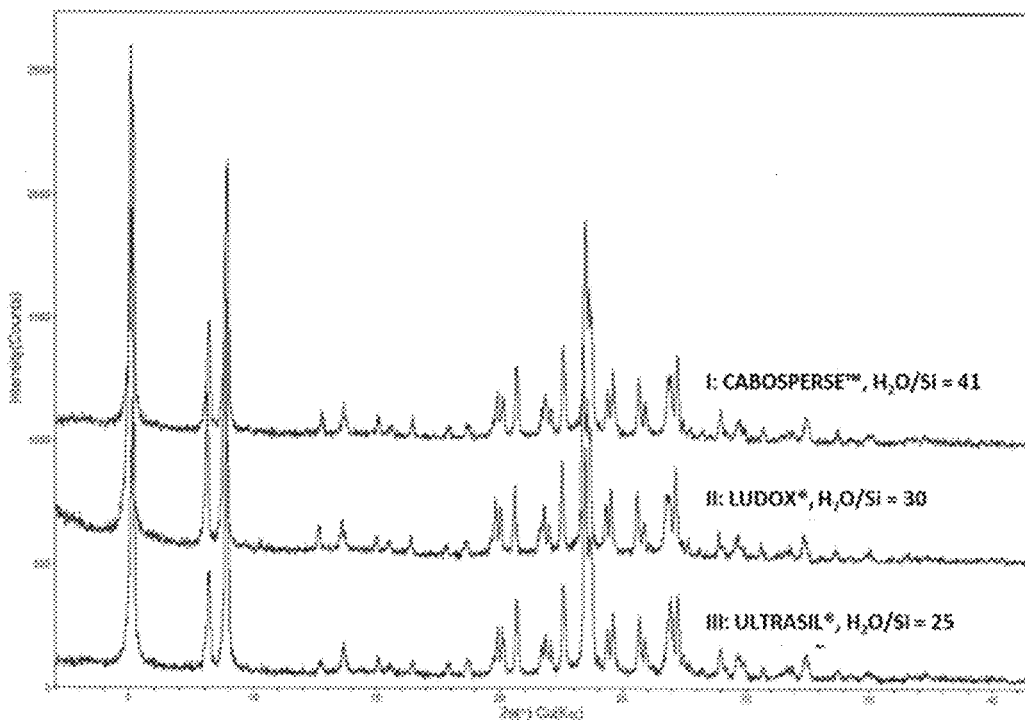
FIG. 11 shows powder XRD patterns of seeded, all-silica experiments of EMM-23 with various silica sources.

For the experiments without freeze-drying to remove water, the $H_2O/SiO_2$ molar ratios were 25, 30, and 41 for the ULTRASIL®, LUDOX®, and CABOSPERSE™, respectively. Note that the water concentration is lowest for the ULTRASIL® because it is only 2-3% water while the other silica sources are aqueous suspensions. The powder XRD patterns in FIG. 11 (pattern I corresponds to CABOS-PERSE™ ($H_2O/SiO_2$=41); pattern II corresponds to LUDOX® ($H_2O/SiO_2$=30); and pattern III corresponds to ULTRASIL® ($H_2O/SiO_2$=25)) show that all of the non-freeze-dried experiments produced pure as-made EMM-23 material. This is surprising because it was not expected that the more dilute conditions would work as well as the concentrated ones. Pure EMM-23 is not generally obtained in dilute conditions, where ZSM-5 has been observed as a contaminant. These experiments show that pure EMM-23 materials can be prepared with typical concentrations (molar ratio of $H_2O/SiO_2$ greater than 15) of water using commercially viable sources of silica.

For the experiments in which freeze-drying was used to remove water, the $H_2O/Si$ molar ratios were 12, 16.5, and 8.5 for the ULTRASIL®, LUDOX®, and CABOSPERSE™, respectively. These experiments required 17 days to reach full crystallization. These freeze-dried preparations did not work as well. The powder patterns show that each of them gave EMM-23 with significant levels of ZSM-5 (data not shown). While it may be counterintuitive that the more concentrated systems would be less successful, this may be because in the case of the experiments with TMOS, the synthesis begins with simple monomeric or oligomeric forms of silica. Perhaps the more common sources (ULTRASIL®, LUDOX®, and CABOSPERSE™) did not work as well because they began in more condensed states of silica. It is believed that these more common silica sources require more digestion time before heating so that they can achieve an initial gel state that is more similar to those of the gels from the TEOS or TMOS sources. In these freeze-dried systems, there was only about 4 hours of digestion of the silica with the SDA source before the water was removed by freeze-drying. The dilute systems may work better because they can solubilize the silica more efficiently than the concentrated ones. Silica that has not been fully mineralized could lead to ZSM-5.

The experiments were repeated where the digestion period for silica was extended from 4 hours to 2 days for each of the silica sources. The dilute experiments (e.g., the $H_2O/Si$ molar ratios are 25, 30, and 41 for the ULTRASIL®, LUDOX®, and CABOSPERSE™, respectively) were carried out both in the presence and in the absence of seeds to determine if the phase selectivity of the dilute conditions was affected by the presence of the seeds. In the experiments with ULTRASIL®, they all successfully produced pure as-made EMM-23 material. For the dilute experiments ($H_2O/SiO_2=25$), both the seeded and unseeded experiments gave pure EMM-23 after 17 days of heating at in a sealed autoclave placed in a convection oven maintained at 150° C. The seeded preparation with $H_2O/SiO_2=10$ worked within 10 days. The same results were obtained for the experiments carried out with LUDOX® AS-40 ($H_2O/SiO_2=30$). The dilute experiments with CABOSPERSE™ ($H_2O/SiO_2=41$) gave a mixture of EMM-23 and ZSM-5 without seeds, but when seeds were used, pure as-made EMM-23 materials for both the concentrated (molar ratio of $H_2O/SiO_2=5$) and dilute systems were obtained.

This study demonstrates that extending the mineralization time improves the selectivity toward EMM-23. Furthermore, the results show that EMM-23, by using a relatively high mixing speed (e.g., 2000 rpm) to homogenize the gel prior to heating, EMM-23 can be prepared with conventional silica sources under typical $H_2O/SiO_2$ molar ratios. The ability to produce EMM-23 materials using silica sources such as ULTRASIL®, LUDOX®, and CABOSPERSE™ can save significant manufacturing material costs as compared to using TEOS or TMOS silica sources.

Example 7

Synthesis of EMM-23 with Different Concentrations of Silanols

Figure 12:
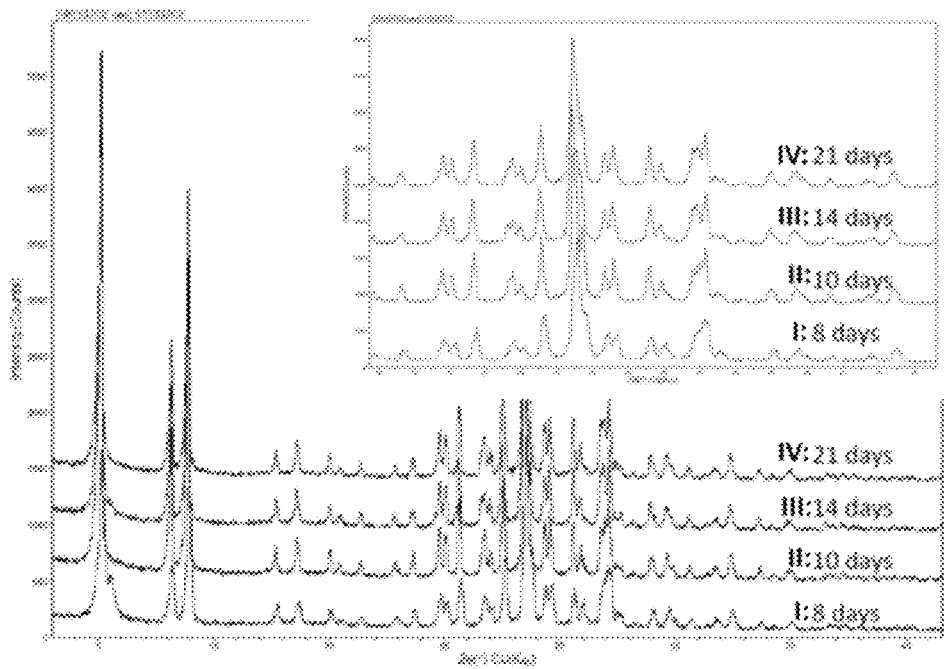
FIG. 12 shows powder XRD patterns of EMM-23 taken after different heating periods of time at a synthesis temperature of 135° C.

This study was carried out to synthesize various as-made EMM-23 materials with different concentrations of silanols. A series of syntheses of as-made EMM-23 materials was carried out, where the samples were sealed in an autoclave placed in a convection oven maintained at temperature of 135° C. and then stopped after 8, 10, 14, and 21 days. Powder XRD pattern data, SEM images, and $^{29}Si$ NMR data were collected for each of these products. With the exception of a minor impurity of layered phase observed in the 8-day product, each of the patterns corresponds to a pure as-made EMM-23 material phase. See FIG. 12 (pattern I corresponds to 8 days; pattern II corresponds to 10 days; pattern III corresponds to 14 days; and pattern IV corresponds to 21 days). All of the patterns can be indexed in a similar hexagonal cell with minor variations in the a and c cell parameters. Examination of the SEM images reveals that the 8-day product has mostly polyhedral crystals with a few platy crystals that correspond to the layered impurity. The shapes of the crystals do not change over the course of the synthesis. The variation in the XRD peak intensities cannot be attributed to preferred orientation or crystal size effects. The structure of EMM-23 is changing with time during the course of the synthesis.

Figure 13:
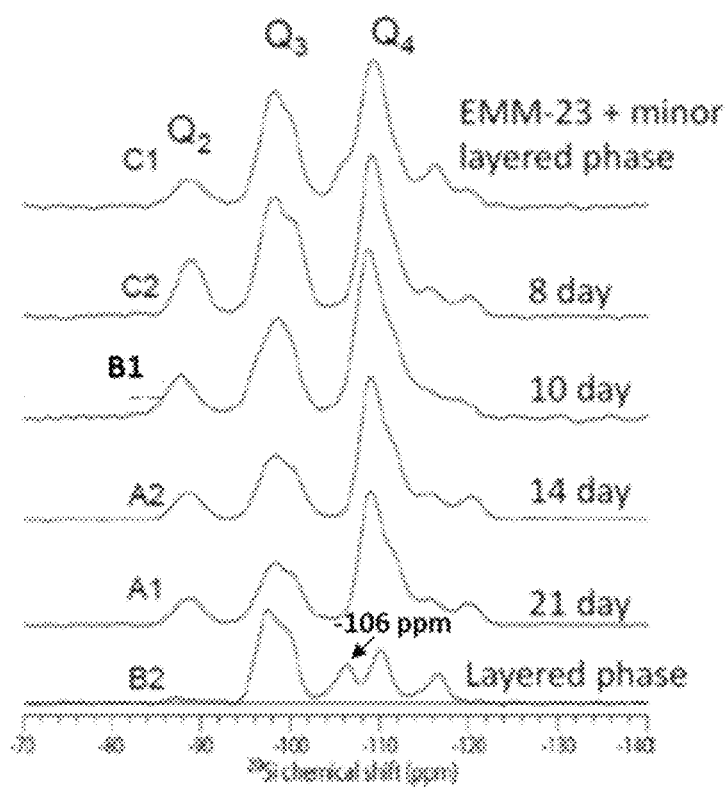
FIG. 13 shows $^{29}$Si NMR spectra of EMM-23 after different heating periods of time and of a layered phase.

FIG. 13 (spectrum C1 corresponds to EMM-23 with minor layered phase; spectrum C2 corresponds to 8 days; spectrum B1 corresponds to 10 days; spectrum A2 corresponds to 14 days; spectrum A1 corresponds to 21 days; and spectrum B2 corresponds to layered phase) compares the $^{29}Si$ NMR of these products with that of the layered phase isolated in another synthesis. The layered phase contained a trace of the EMM-23. Table F shows the quantitation of the Q2, Q3, and Q4 species for each of these spectra. To illustrate how the layered impurity can be detected from the NMR data, at the top of FIG. 13 is the spectrum of an EMM-23 product contaminated with this phase. Many of the peaks that occur in the layered phase overlap with those of the EMM-23. However, there is a peak at −106 ppm that is present only in the layered phase. This peak is not observed in any of the pure EMM-23 samples, but it is manifested as a shoulder on the large Q4 peak in the sample that is contaminated with the layered phase. The layered phase does not possess the Q2 peaks. This is further evidence that the large concentration of Q2 observed at short synthesis times cannot be attributed to the layered phase; the Q2 species are intrinsic to the EMM-23. The Q2 and Q3 contents decrease with time. After 8, 10, and 14 days the Q2 and Q3 contents are 12.8 and 37.4%, 11.2 and 31.4%, and 8.7 and 28.0%, respectively. There is minimal change between 14 and 21 days. See Table F.

TABLE F

Quantitation of peaks in the $^{29}Si$ NMR of EMM-23 samples collected after different heating time periods

| Experiment | Q2 −88 ppm | Q3 −99 ppm | Q4 −110 ppm | Q4 −115 ppm | Q2 + Q3 | Q4, all |
|---|---|---|---|---|---|---|
| C1 | 7.1 | 35.4 | 45.8 | 11.7 | 42.5 | 57.5 |
| C2 | 12.8 | 37.4 | 41.2 | 8.6 | 50.2 | 49.8 |

TABLE F-continued

Quantitation of peaks in the $^{29}$Si NMR of EMM-23 samples collected after different heating time periods

| Experiment | Q2 −88 ppm | Q3 −99 ppm | Q4 −110 ppm | Q4 −115 ppm | Q2 + Q3 | Q4, all |
|---|---|---|---|---|---|---|
| B1 | 11.2 | 31.4 | 48.3 | 9.1 | 42.6 | 57.4 |
| A2 | 8.7 | 28.0 | 49.2 | 14.1 | 36.7 | 63.3 |
| A1 | 9.0 | 28.6 | 49.2 | 13.2 | 37.6 | 62.4 |
| B2 | 3.5 | 51.8 | 13.4 (−106 ppm) | 19.6 (−110 ppm) 11.6 (−115 ppm) | 55.3 | 44.7 |

Various modifications of the disclosure, in addition to those described herein, will be apparent to those skilled in the art from the foregoing description. Such modifications are also intended to fall within the scope of the appended claims. Each reference, including without limitation all patent, patent applications, and publications, cited in the present application is incorporated herein by reference in its entirety.

The invention claimed is:

1. A process of preparing a modified EMM-23 material of Formula II:

$$X_2O_3:(m)YO_2 \quad \text{(Formula II)},$$

comprising combining a composition of Formula (III):

$$X_2O_3:(t)YO_2 \quad \text{(Formula III)},$$

with an agent comprising X to generate a material of Formula II, wherein the agent is selected from the group consisting of $Al(NO_3)_3$, $Al_2(SO_4)_3$, $AlCl_3$, $Fe(NO_3)_3$, and mixtures thereof;
wherein m is less than 150, t is greater than or equal to 150, X is a trivalent element, and Y is a tetravalent element.

2. The process of claim 1 further comprises adjusting the pH of the combination of the composition of Formula III and the agent comprising X to within the range of 2.4 to 2.6.

3. The process of claim 1 further comprises adjusting the pH of the combination of the composition of Formula III and the agent comprising X by adding an additional amount of the agent comprising X, such that the pH of the combination having the additional amount of the agent comprising X is within the range of 2.4 to 2.6.

4. The process of claim 3, wherein the process of combining additional amount of the agent comprising X and adjusting the pH of the combination to within the range of 2.4 to 2.6 is repeated until the pH does not change when additional amount of the agent comprising X is added.

5. The process of claim 3, wherein the adjusting of the pH comprises adding a base or an acid to the combination of the composition of Formula III and the agent comprising X.

6. The process of claim 5, wherein the adjusting of the pH comprises adding a base.

7. The process of claim 6, wherein the base comprises an organic amine base.

8. The process of claim 6, wherein the base comprises ammonium hydroxide.

9. The process of claim 3 further comprises heating the pH adjusted combination of the composition of Formula III and the agent comprising X at a temperature from 50° C. to 200° C.

10. The process of claim 9, wherein the heating comprises heating the combination of the composition of Formula III and the agent comprising X for 1 to 48 hours.

11. A modified EMM-23 material of Formula II:

$$X_2O_3:(m)YO_2 \quad \text{(Formula II)},$$

wherein m is from 80 to 130, X is a trivalent element, and Y is a tetravalent element; and
wherein the material is substantially free of an impurity.

12. The material of claim 11, wherein the impurity is selected from zeolite beta, ZSM-5, or a mixture thereof.

13. The material of claim 11, wherein the material has an alpha value of greater than 10.

14. The material of claim 11, wherein the material has an alpha value of 15 to 50.

15. The material of claim 11 having a micropore volume greater than 0.15 cc/g.

16. The material of claim 11 having a micropore volume of 0.15 to 0.30 cc/g.

17. The material of claim 11 having a cell a-parameter of 19.6±0.5 Å and c-parameter of 13.5±0.5 Å.

18. The material of claim 11, wherein X comprises B, Al, Fe, Ga, or a mixture thereof.

19. The material of claim 11, wherein Y comprises Si, Ge, Sn Ti, Zr, or a mixture thereof.

20. The modified EMM-23 material of claim 11, after calcination, having at least four XRD peaks selected from Table 4A:

TABLE 4

| degree 2-theta (±0.20) | d-spacing (Å) | Relative intensity [100 x I/(Io)] (±30%) |
|---|---|---|
| 5.23 | 16.87 | 100 |
| 8.40 | 10.51 | 32 |
| 9.06 | 9.76 | 68 |
| 15.98 | 5.54 | 15 |
| 23.81 | 3.73 | 50 |
| 24.07 | 3.69 | 15. |

* * * * *